United States Patent
Xin et al.

(10) Patent No.: US 12,457,644 B2
(45) Date of Patent: Oct. 28, 2025

(54) FAST RESTRICTED TARGET WAIT TIME UPDATE

(71) Applicants: SONY GROUP CORPORATION, Tokyo (JP); SONY CORPORATION OF AMERICA, New York, NY (US)

(72) Inventors: Liangxiao Xin, Santa Clara, CA (US); Mohamed Abouelseoud, Burlingame, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 402 days.

(21) Appl. No.: 18/067,978

(22) Filed: Dec. 19, 2022

(65) Prior Publication Data

US 2023/0199847 A1 Jun. 22, 2023

Related U.S. Application Data

(60) Provisional application No. 63/265,750, filed on Dec. 20, 2021.

(51) Int. Cl.
*H04W 4/00* (2018.01)
*H04W 74/00* (2009.01)
*H04W 74/0816* (2024.01)

(52) U.S. Cl.
CPC ..... *H04W 74/0816* (2013.01); *H04W 74/006* (2013.01)

(58) Field of Classification Search
USPC .................................. 370/329, 330
See application file for complete search history.

(56) References Cited

U.S. PATENT DOCUMENTS

2021/0360646 A1 11/2021 Chu
2023/0025546 A1* 1/2023 Hu ......................... H04W 72/54
(Continued)

FOREIGN PATENT DOCUMENTS

WO 2020013874 A1 1/2020

OTHER PUBLICATIONS

Chunyu Hu (Facebook) : "CC36-CR-35.6 Traffic Prioritization During Restricted TWT SPs", IEEE Draft; 11-21-1115-00-00BE-CC36-CR-35-6—Traffic-Prioritization-During-Restricted-TWT-SPS, IEEE-SA Mentor, Piscataway, NJ USA vol. 802.11 EHT; 802.11 be Jul. 28, 2021 (Jul. 28, 2021), pp. 1-14, XP068184431.
(Continued)

*Primary Examiner* — Chuong T Ho
(74) *Attorney, Agent, or Firm* — O'BANION & RITCHEY LLP; John P. O'Banion

(57) ABSTRACT

Enhanced R-TWT scheduling is performed in which the R-TWT scheduling AP can perform scheduling quickly to react quickly to changes in the network environment and optimize R-TWT scheduling for efficiency and stability. The R-TWT scheduling AP transmits R-TWT trigger frames and is able to collect information from R-TWT scheduled STAs which may affect R-TWT scheduling. The scheduling can take into account that some member STAs may be dozing (asleep) for several beacon intervals and do not wake up for the beacon, then the R-TWT scheduling AP initiates the update of parameters when needed to check on those STAs to determine if any updates are needed. The R-TWT trigger frame can allocate resource units (RU) for R-TWT scheduled STAs to communicate back to the R-TWT scheduling AP.

17 Claims, 27 Drawing Sheets

(56) References Cited

U.S. PATENT DOCUMENTS

| | | | |
|---|---|---|---|
| 2023/0037879 A1* | 2/2023 | Shafin | H04W 72/12 |
| 2023/0051808 A1* | 2/2023 | Fang | H04W 72/543 |
| 2023/0104446 A1* | 4/2023 | Ajami | H04W 84/12 |
| | | | 370/329 |
| 2024/0129249 A1* | 4/2024 | Lu | H04W 28/02 |
| 2024/0251355 A1* | 7/2024 | Kim | H04W 74/06 |
| 2024/0251443 A1* | 7/2024 | Lu | H04W 74/0866 |
| 2024/0356817 A1* | 10/2024 | Wang | H04W 28/18 |

OTHER PUBLICATIONS

Thomas Handte (Sony): "Primary and Secondary User in R TWT", IEEE Draft; 11-21-1656-00-00BE—Primary-and-Secondary-User-in-R-TWT, IEEE-SA Mentor, Piscataway, NJ USA vol. 802.11 EHT; 802.11 be Oct. 8, 2021 (Oct. 8, 2021), pp. 1-15, XP068185296.

\* cited by examiner

FIG. 1 (Prior Art) — TSPEC element format

| Element ID | Length | TS Info | Nominal MSDU Size | Maximum MSDU Size | Minimum Service Interval | Maximum Service Interval | Inactivity Interval | Suspension Interval |

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |

FIG. 2 (Prior Art) — TS Info field format

| Traffic Type | TSID | Direction | Access Policy | Aggregation | APSD | User Priority | TSInfo Ack Policy | Schedule | Reserved |

FIG. 3 (Prior Art) — TCLAS element format

| Element ID | Length | User Priority | Frame Classifier |

FIG. 4 (Prior Art) — TCLAS Process element

| Element ID | Length | Processing |

FIG. 5 (Prior Art)

TWT element

| Element ID | Length | Control | TWT parameter Information |
|---|---|---|---|

FIG. 6 (Prior Art)

Control field in TWT element

| NDP Paging Indicator | Responder PM Mode | Negotiation Type | TWT Information Frame Disabled | Wake Duration Unit | Reserved |
|---|---|---|---|---|---|

FIG. 7 (Prior Art)

Broadcast TWT parameter Information field (when Negotiation Type is 2 or 3)

| Request Type | Target Wake Time | Nominal Minimum TWT Wake Duration | TWT Wake Interval Mantissa | Broadcast TWT Info | Restricted TWT Traffic Info (optional) |
|---|---|---|---|---|---|

FIG. 8 (Prior Art)

Request type field in Broadcast TWT parameter Information field

| TWT Request | TWT Setup Command | Trigger | Last Broadcast Parameter Set | Flow Type | Broadcast TWT Recommendation | TWT Wake Interval Exponent | Reserved |
|---|---|---|---|---|---|---|---|

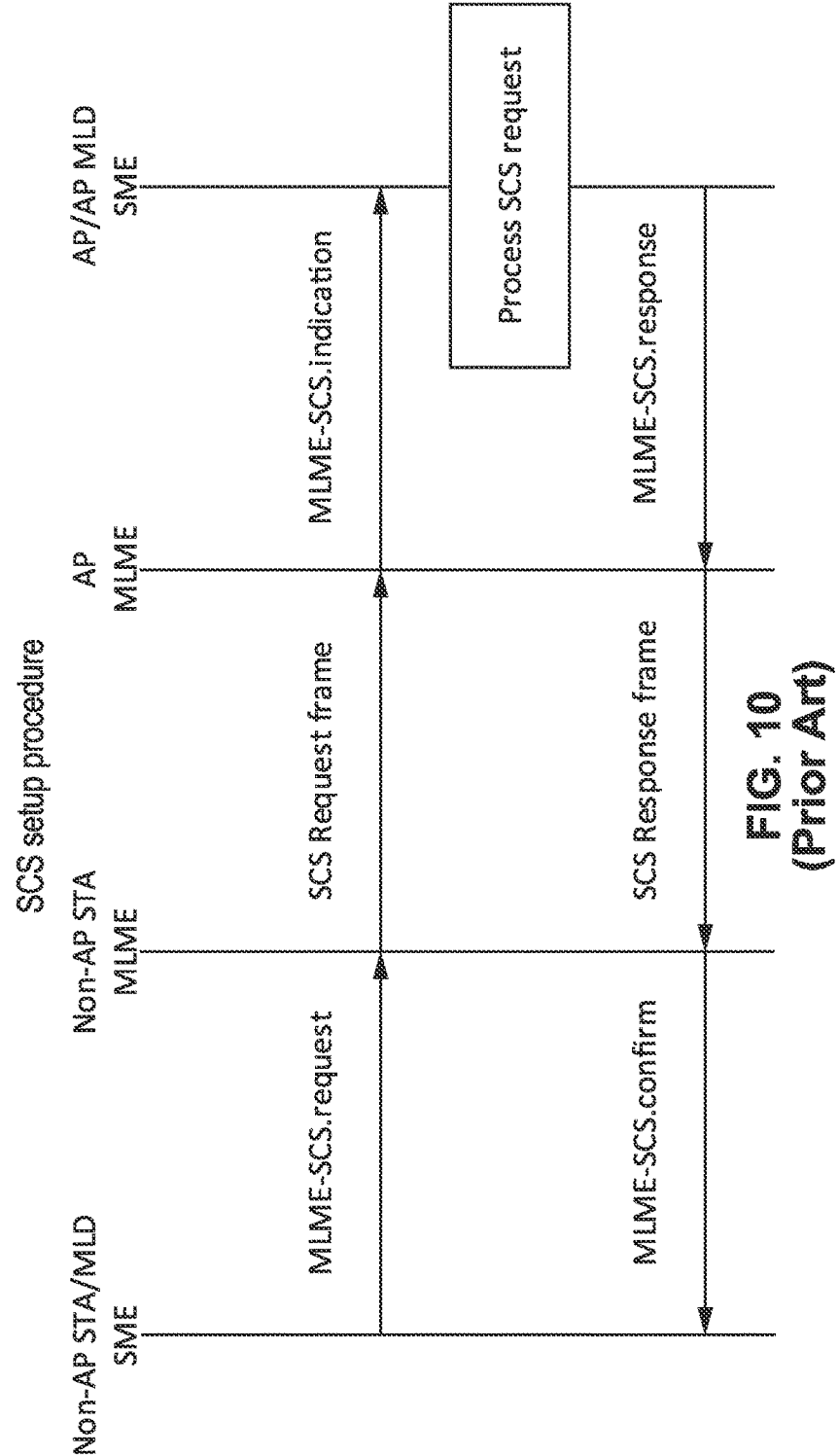

SCS request frame

| Frame Control | Duration | Address 1 | Address 2 | Address 3 | Sequence Control | Action | FCS |

| Category | Robust Action | Dialog token | SCS Descriptor List |

FIG. 11 (Prior Art)

SCS Descriptor element format

| Element ID | Length | SCSID | Request Type | Intra-Access Category Priority | TCLAS | TCLAS Processing (optional) | TSPEC | Optional Subelements |

FIG. 12 (Prior Art)

SCS response frame

| Frame Control | Duration | Address 1 | Address 2 | Address 3 | Sequence Control | Action | FCS |

| Category | Robust Action | Dialog token | SCS Status List |

FIG. 13 (Prior Art)

SCS status field

| SCSID | Status |

| L-STF | L-LTF | L-SIG | RL-SIG | HE-SIG-A | HE-SIG-B | HE-STF | HE-LTFs | Data | PE |
|---|---|---|---|---|---|---|---|---|---|
| 8μs | 8μs | 4μs | 4μs | 8μs | 16μs | 4μs | | | |

| L-STF | L-LTF | L-SIG | RL-SIG | HE-SIG-A | HE-STF | HE-LTFs | Data | PE |
|---|---|---|---|---|---|---|---|---|
| 8μs | 8μs | 4μs | 4μs | 8μs | 8μs | | | |

FIG. 19
(Prior Art)

Trigger frame

| Frame Control | Duration | RA | TA | Common Info | User Info | ... | User Info | FCS |
|---|---|---|---|---|---|---|---|---|

FIG. 20
(Prior Art)

Common Info field

| Trigger Type | Length | Cascading Indication | CS Required | BW | GI And LTF Type | MU MIMO LTF Mode | Number of HE-LTF Symbols | STBC |

| LDPC Extra Symbol Segment | AP TX Power | Packet Extension | Spatial Reuse | Doppler | HE-SIG-A Reserved | Reserved | Trigger dependent common info |

**FIG. 21
(Prior Art)**

User Info field

| AID12 | RU Allocation | Coding Type | MCS | DCM | SS Allocation | Target RSSI | Reserved | Trigger dependent user info |

**FIG. 22
(Prior Art)**

MU-BAR variant

| BAR control | BAR info |

**FIG. 23
(Prior Art)**

BA frame

| Frame Control | Duration | RA | TA | BA control | BA info | FCS |

**FIG. 24
(Prior Art)**

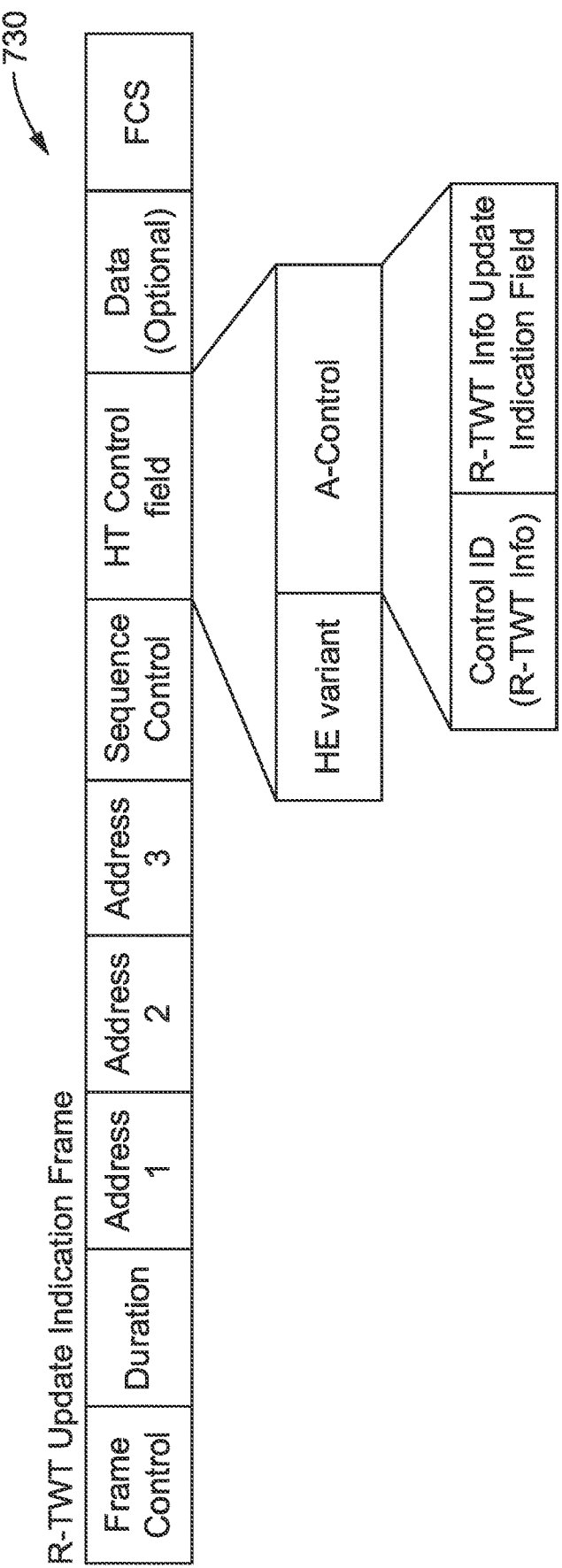

FAST RESTRICTED TARGET WAIT TIME UPDATE

CROSS-REFERENCE TO RELATED APPLICATIONS

This application claims priority to, and the benefit of, U.S. provisional patent application Ser. No. 63/265,750 filed on Dec. 20, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless local area networks using CSMA/CA, and more particularly to a protocol with quick R-TWT scheduling.

2. Background Discussion

Current wireless technologies using Carrier-Sense Multiple Access/Collision Avoidance (CSMA/CA) focuses on high throughput performance of the network but does not have low latency capability. However, an increasing number of applications, such as Real-Time Applications (RTA), require low latency, and thus a technology gap exists.

The RTA requires low latency communication and uses best effort communication. The data generated from the RTA is called RTA traffic (or latency sensitive traffic) and will be packetized as RTA frames at the transmitter STA. Also, the data generated from the non-time sensitive application is called non-RTA traffic (or regular traffic) and will be packetized as non-RTA frames at the transmitter STA. Then, the transmitter STA transmits packets carrying frames to the receiver STA over the channel.

The RTA frame requires low latency due to its high timeliness delivery requirement; as the RTA frame is valid only if it is delivered within a certain period of time. One solution in a CSMA/CA wireless technology space is to schedule a Restricted Target Wake Time (R-TWT) Service Period (SP) as defined in IEEE 802.11 be to reserve a channel resource for the RTA frame exchange. During the R-TWT SPs, the RTA frames have a higher transmission priority than non-RTA frames.

In IEEE 802.11 be, the signaling of R-TWT is the same as the broadcast TWT as defined in IEEE 802.11ax, whereby the TWT scheduling AP can set the broadcast TWT Recommendation subfield to "4" to indicate that TWT signaling is for a restricted TWT. In IEEE 802.11ax, a TWT scheduling Access Point (AP) may transmit a broadcast announcement at any time. MAC Management Protocol Data Units (MMPDUs) that contain a broadcast TWT element generated by a TWT scheduling AP can be broadcast as Probe Response, FILS Discovery, and Beacon frames.

Current R-TWT operations have significant limitations which impact QoS requirements, latency, jitter and packet loss, and which prevent rapid scheduling decisions and operations.

Accordingly, a need exists for enhanced R-TWT scheduling. The present disclosure fulfills that need and provides additional benefits.

BRIEF SUMMARY

A fast R-TWT update process is described for wireless communication in a network for an IEEE 802.11 protocol configured for supporting carrier sense multiple access/collision avoidance (CSMA/CA) and Enhanced Distributed Channel Access (EDCA). The enhanced protocol provides enhanced scheduling of restricted target wait time (R-TWT). An AP performing as an R-TWT scheduling AP announces R-TWT scheduling to exchange frames with member STAs of an R-TWT during the R-TWT service periods (SPs). The R-TWT scheduling AP requests information as to whether its R-TWT scheduled STAs have R-TWT information to update the R-TWT scheduling AP about. Responses are received from R-TWT scheduled STAs on whether they have information related to the R-TWT to update. The R-TWT scheduling AP triggers the transmissions for those R-TWT scheduled STAs. The R-TWT scheduling AP obtains update information from R-TWT scheduled STAs related to the R-TWT and can adjust scheduling and announce new R-TWT SP scheduling.

The R-TWT scheduling AP can transmit R-TWT trigger frames (TFs) for triggering transmissions from R-TWT scheduled STAs to report update information. The TF can include information on resource allocations of Resource Units (RUs) through which the STAs may respond to the R-TWT scheduling AP.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 1 is a data field diagram of TSPEC element which is defined in IEEE 802.11.

FIG. 2 is a data field diagram of information in the TS Information field of FIG. 1.

FIG. 3 is a data field diagram of the contents in the TCLAS element defined in IEEE 802.11.

FIG. 4 is a data field diagram of content of the TCLAS Processing element as defined in IEEE 802.11.

FIG. 5 is a data field diagram of the TWT element defined in IEEE 802.11ax.

FIG. 6 is a data field diagram of a Control field of the TWT element.

FIG. 7 is a data field diagram of a Broadcast TWT parameter Information field element when Negotiation Type is 2 or 3.

FIG. 8 is a data field diagram of a Request type field in the Broadcast TWT parameter Information field.

FIG. 9 is a data field diagram of a Broadcast TWT Information field in the Broadcast TWT parameter Information field.

FIG. 10 is an interworking model of an SCS setup defined in IEEE 802.11be.

FIG. 11 is a data field diagram of an SCS request frame.

FIG. 12 is a data field diagram of the SCS descriptor list field format from FIG. 11 and how it can carry multiple SCS descriptor elements.

FIG. 13 is a data field diagram of the format of SCS response frame.

FIG. 14 is a data field diagram of the SCS status list field, and it carries multiple SCS status fields.

FIG. 18 is a data field diagram of a High Efficiency (HE) multi-user (MU) PPDU format used for downlink multi-user transmission.

FIG. 19 is a data field diagram of a HE Trigger-based (TB) PPDU format used for uplink multi-user transmission.

FIG. 20 is a data field diagram of Trigger frame content.

FIG. 21 is a data field diagram of subfields in the Common Information field from FIG. 20.

FIG. 22 is a data field diagram of subfields in the User Information Field seen in FIG. 20.

FIG. 23 is a data field diagram of a Trigger dependent User Info field in the Trigger frame for an MU-BAR.

FIG. 24 is a data field diagram of a block Ack (BA) frame.

FIG. 38 is a data field diagram of an R-TWT information frame according to at least one embodiment of the present disclosure.

FIG. 39 is a data field diagram of R-TWT Update Indication frame according to at least one embodiment of the present disclosure.

DETAILED DESCRIPTION

1. Elements in Existing IEEE802.11

Figure 15:
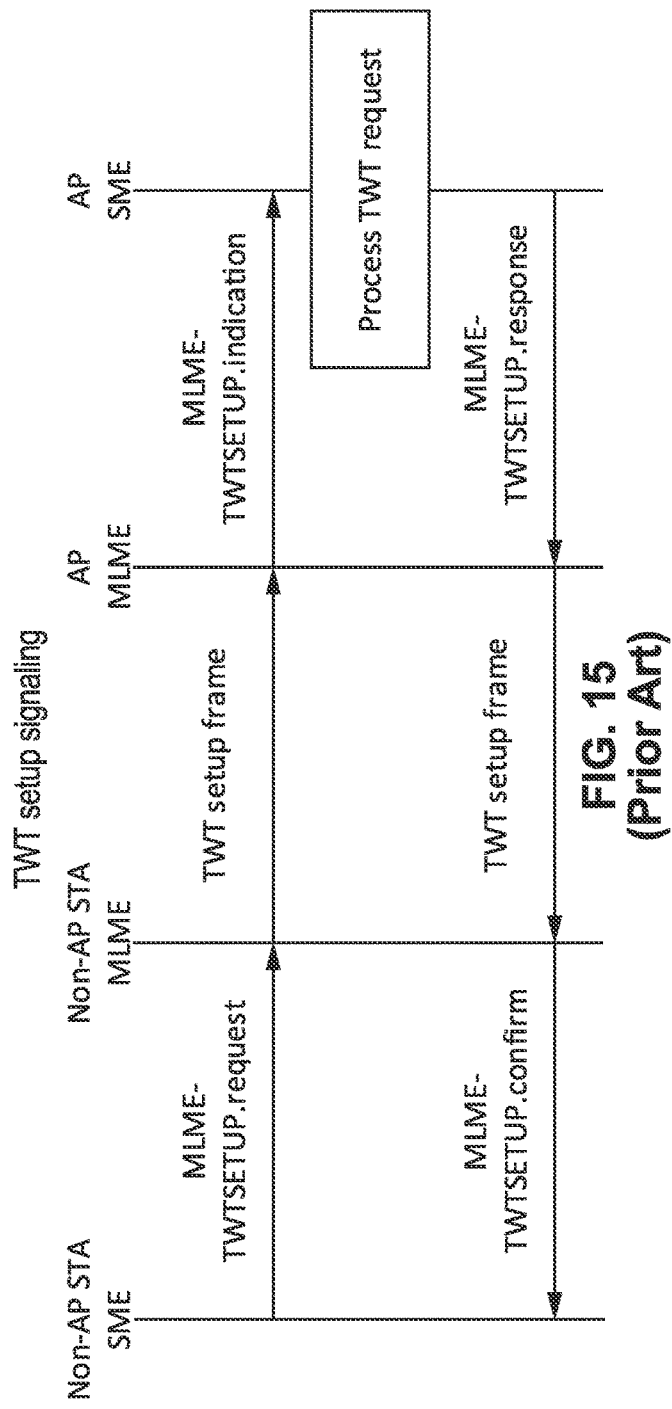
FIG. 15 is an interworking model of a TWT setup defined in IEEE 802.11ax.

1.1. Data Structures
1.1.1. TSPEC Element

FIG. 1 depicts content in the TSPEC element which is defined in IEEE 802.11. An Element ID field indicates the type of element; which in this instance indicates a Traffic Specification (TSPEC) element. A Length field indicates the length of the TSPEC element. A TS Info (information) field indicates the traffic stream information as shown in FIG. 2. A Nominal MAC Service Data Unit (MSDU) Size field indicates the nominal size of MSDUs or Aggregated-MSDUs (A-MDSUs) belonging to the TS under this TSPEC. A Maximum MSDU Size field indicates the maximum size of MSDUs or A-MSDUs belonging to the TS under this TSPEC. A Minimum Service Interval field indicates the minimum time between the start time of two successive service periods (SPs). A Maximum Service Interval field indicates the maximum time between the start time of two successive SPs. An Inactivity Interval field indicates the time without arrival or transmission of a MSDU belonging to the Traffic Stream (TS) before that TS is deleted. A Suspension Interval field indicates the time without arrival or transmission of an MSDU belonging to the TS before the generation of successive Quality of Service (QoS)(+) Contention-Free-Poll (CF-Poll) is stopped for this TS. A Service Start Time field indicates the start time of the first SP. A Minimum Data Rate field indicates the lowest data rate specified by Medium Access Control (MAC) Service Access Point (SAP) for transmitting MSDUs or A-MSDUs belonging to the TS under this TSPEC. A Mean Data Rate field indicates the average data rate specified by MAC SAP for transmitting MSDUs or A-MSDUs belonging to the TS under this TSPEC. A Peak Data Rate field indicates the maximum data rate specified by MAC SAP for transmitting MSDUs or A-MSDUs belonging to the TS under this TSPEC. A Burst Size field indicates the maximum burst of MSDUs or A-MSDUs belonging to the TS under this TSPEC at the peak data rate. A Delay Bound field indicates the maximum time that is allowed for transmitting a MSDU or A-MSDU belonging to the TS under this TSPEC. A Minimum PHY Rate field indicates the lowest PHY rate for transmitting MSDUs or A-MSDUs belonging to the TS under this TSPEC. A Surplus Bandwidth Allowance field indicates the ratio of the bandwidth used for transmitting a MSDU or A-MSDU belonging to the TS under this TSPEC and its retransmissions to the bandwidth used for transmitting that MSDU or A-MSDU once at the minimum PHY rate. A Medium Time field indicates the time that is allowed for accessing the medium. A DMG Attributes field is presented when the TSPEC is applied to a directional multi-gigabit (DMG) BSS.

1.1.2. TS Info Field

FIG. 2 depicts the contents of the TS Info field which was depicted in FIG. 1, and which has the following subfields. A Traffic Type subfield specifies whether the traffic is periodic or not. A TSID subfield indicates an Identification (ID) number for identifying the TS. A Direction subfield specifies the direction of data transmission. An Access Policy subfield specifies the method to use for gaining channel access. An Aggregation subfield specifies whether the aggregation schedule is required. An APSD subfield indicates whether automatic PS delivery is to be utilized. A User Priority subfield indicates user priority of the MSDU or A-MSDU belonging to the TS. A TSInfo Ack Policy indicates whether the Ack is required, and which form of Ack is to be utilized. A Schedule subfield indicates the type of scheduling to be utilized.

1.1.3. TCLAS Element

FIG. 3 depicts the content in the TCLAS element which is defined in IEEE 802.11. An Element ID field indicates the type of element; which in this instance is a TCLAS element. A Length field indicates the length of the TCLAS element. A User Priority field indicates user priority from the upper layer. A Frame Classifier field indicates the method to use for classifying the frames from the upper layer.

1.1.4. TCLAS Process Element

FIG. 4 depicts content of the TCLAS Processing element which is defined in IEEE 802.11. An Element ID field indicates the type of element; which in this instance is a TCLAS Processing element. A Length field indicates the length of the TCLAS Processing element. A Processing field indicates the method to use for classifying the traffic from the upper layer when multiple TCLAS elements exist.

1.1.5. TWT Element

FIG. 5 depicts the format of the TWT element defined in IEEE 802.11ax. When the negotiation type field in the control field of the TWT element is set to "2" or "3", then the TWT parameter information field in the TWT element carries the broadcast TWT parameter Information field as shown in FIG. 7.

It should be noted that there is an update in the IEEE 802.11 be (Draft P802.11be_D1.01). Such that when the broadcast TWT recommendation field in the Request type field in Broadcast TWT parameter Information field is set to "4", it represents the broadcast TWT (B-TWT) indicated in the Broadcast TWT parameter Information field is a restricted TWT (R-TWT).

FIG. 6 depicts a Control field of the TWT element, and is shown having the following fields. An NDB Paging Indicator subfield is a Network Discovery Beacon (NDB) paging indicator. It also contains the following fields: A Responder PM Mode, Negotiation Type, TWT Information Frame Disabled, Wake Duration Unit, and a reserved field.

FIG. 1 depicts a Broadcast TWT parameter Information field element when Negotiation Type value is "2" or "3". This element is shown with the following subfields: Request Type, Target Wake Time, Nominal Minimum TWT Wake Duration, TWT Wake Interval Mantissa, Broadcast TWT information, and optional Restricted TWT Traffic information.

FIG. 8 depicts a Request type field in the Broadcast TWT parameter Information field, having the following subfields TWT Request, TWT Setup Command, Trigger, Last Broadcast Parameter Set, Flow Type, Broadcast TWT Recommendation, TWT Wake Interval Exponent, and a reserved subfield.

FIG. 2 depicts a Broadcast TWT Information field in the Broadcast TWT parameter Information field, having the following subfields: Restricted TWT Traffic Information Present, Reserved, Broadcast TWT Identification (ID), and Broadcast TWT Persistence.

1.2. SCS Signaling

FIG. 10 depicts an example of a SCS setup defined in IEEE 802.11 be (Draft P802.11be_D1.01). The interworking model of the STAs can be the same as defined in the IEEE 802.11 standard.

The non-AP STA decides to initiate a SCS setup procedure with the AP. The Station Management Entity (SME) of the non-AP STA sends a MLME-SCS.request message to its MAC Sublayer Management Entity (MLME). When the MLME of the non-AP STA receives the MLME-SCS.request message, it collects the information in the MLME-SCS.request message and sends a SCS request frame to the AP. The MLME of the AP receives the frame and generates a MLME-SCS.indication message to its SME. The AP processes the request. Then, the SME of the AP sends an MLME-SCS.response message containing SCS setup results to its MLME. Then, the MLME of the AP sends a SCS response frame to the non-AP STA. The MLME of the non-AP STA receives the frame and sends an MLME-SCS.confirm message to its SME. In this way the non-AP can recognize whether the SCS setup was successful or not.

FIG. 11 depicts the format of an SCS request frame having the following subfields: Frame Control, Duration, Address 1-3, Sequence Control Action, and FCS. The Action subfield is shown further divided into the following subfields: Category, Robust Action, Dialog Token, and SCS Descriptor List.

FIG. 12 depicts the format of the SCS descriptor list field from FIG. 11 and how it can carry multiple SCS descriptor elements. The SCS descriptor element has the following subfields: Element ID, Length, SCSIS, Request Type, Intra-Access Category Priority, TCLAS, TCLAS Processing (optional), TSPEC, and Optional Sub elements.

FIG. 13 depicts the format of SCS response frame, having the following subfields: Frame Control, Duration, Address 1-3, Sequence Control Action, and FCS. The Action subfield is shown containing the following subfields: Category, Robust Action, Dialog Token, and SCS Status List.

FIG. 14 depicts that the SCS status list field can carry multiple SCS status fields. In each SCS status field, the status subfield represents the SCS setup result (e.g., accept, reject, reject with reasons, terminate, and so on) of the SCS indicated in the SCSID field.

1.3. R-TWT Signaling

FIG. 15 depicts an example of a TWT setup defined in IEEE 802.11ax. The interworking model of the STAs can be the same as defined in IEEE 802.11 standard.

The non-AP STA decides to initiate a TWT setup procedure with the AP. The Station Management Entity (SME) of the non-AP STA sends a MLME-TWTSETUP.request message to its MAC Sublayer Management Entity (MLME). When the MLME of the non-AP STA receives the MLME-TWTSETUP.request message, it collects the information in the MLME-TWTSETUP.request message and sends a TWT setup frame (i.e., TWT request frame) to the AP. The MLME of the AP receives the frame and generates a MLME-TWTSETUP.indication message to its SME.

The AP processes the request. Then, the SME of the AP sends an MLME-TWTSETUP.response message containing TWT setup result to its MLME. Then, the MLME of the AP sends a TWT setup frame (i.e., TWT response frame) to the non-AP STA. The MLME of the non-AP STA receives the frame and sends an MLME-TWTSETUP.confirm message to its SME. In this way the non-AP determines whether the TWT setup was successful or not.

Figure 16:
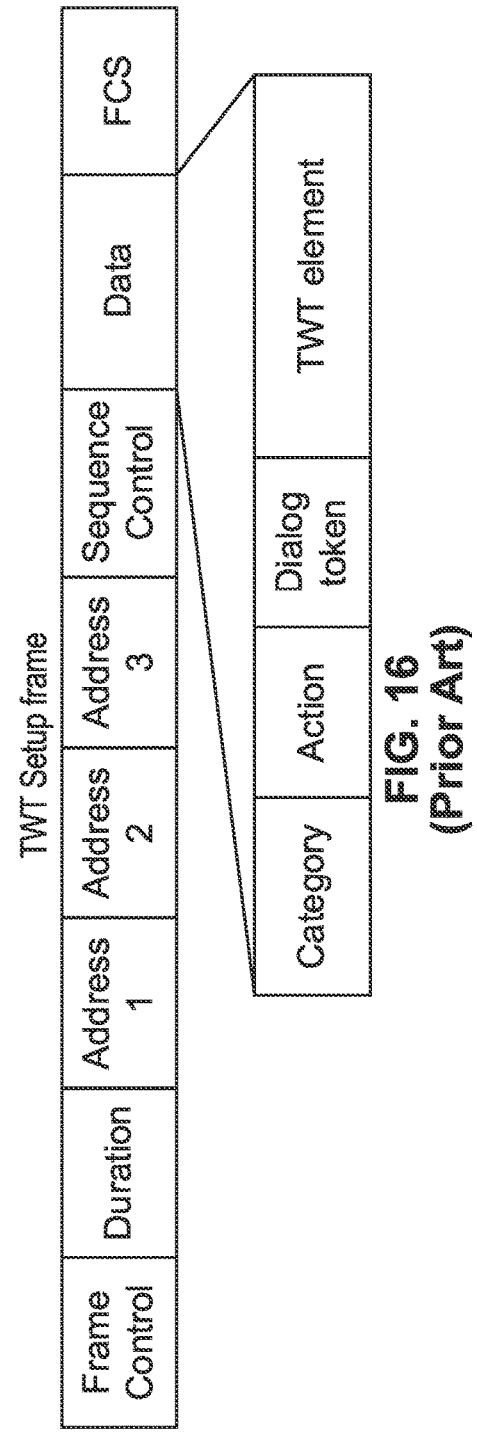
FIG. 16 is data field diagram of a TWT setup frame, in which the TWT element in the frame was shown in FIG. 5.

FIG. 16 depicts the format of a TWT setup frame, in which the TWT element in the frame was shown in FIG. 5. The TWT Setup frame is shown with the following fields: Frame Control, Duration, Addresses 1-3, Sequence Control, Data, and FCS. The Data field is shown with the following subfields: Category, Action, Dialog Token, and TWT Element.

According to the definition in IEEE 802.11 be, a restricted TWT R-TWT scheduling AP, referred to as an R-TWT scheduling AP, is an Extra High Throughput (EHT) AP that supports restricted TWT operation and sets the Restricted TWT Support subfield in transmitted EHT Capabilities elements to "1".

A restricted TWT R-TWT scheduled STA, referred to as an R-TWT scheduled STA, is a non-AP EHT STA that supports restricted TWT operations and sets the Restricted TWT Support subfield in transmitted EHT Capabilities elements to "1".

A R-TWT scheduled STA can establish membership of one or more R-TWTs scheduled by the R-TWT scheduling AP. The R-TWT setup signaling is the same as the broadcast TWT with additional parameter settings, which are used for the membership negotiation of a R-TWT between the R-TWT scheduled STA and the R-TWT scheduling AP. After a R-TWT scheduled STA establishes membership of the R-TWT scheduled by the R-TWT scheduling AP, the R-TWT scheduled STA has higher priority or is allowed to exchange frames with the R-TWT scheduling AP during the SPs of the R-TWT. Contrary to this, the R-TWT scheduled STA that is not a member of the R-TWT either has lower priority, or is not allowed to exchange frames with the R-TWT scheduling AP during the SPs of the R-TWT.

Figure 17:
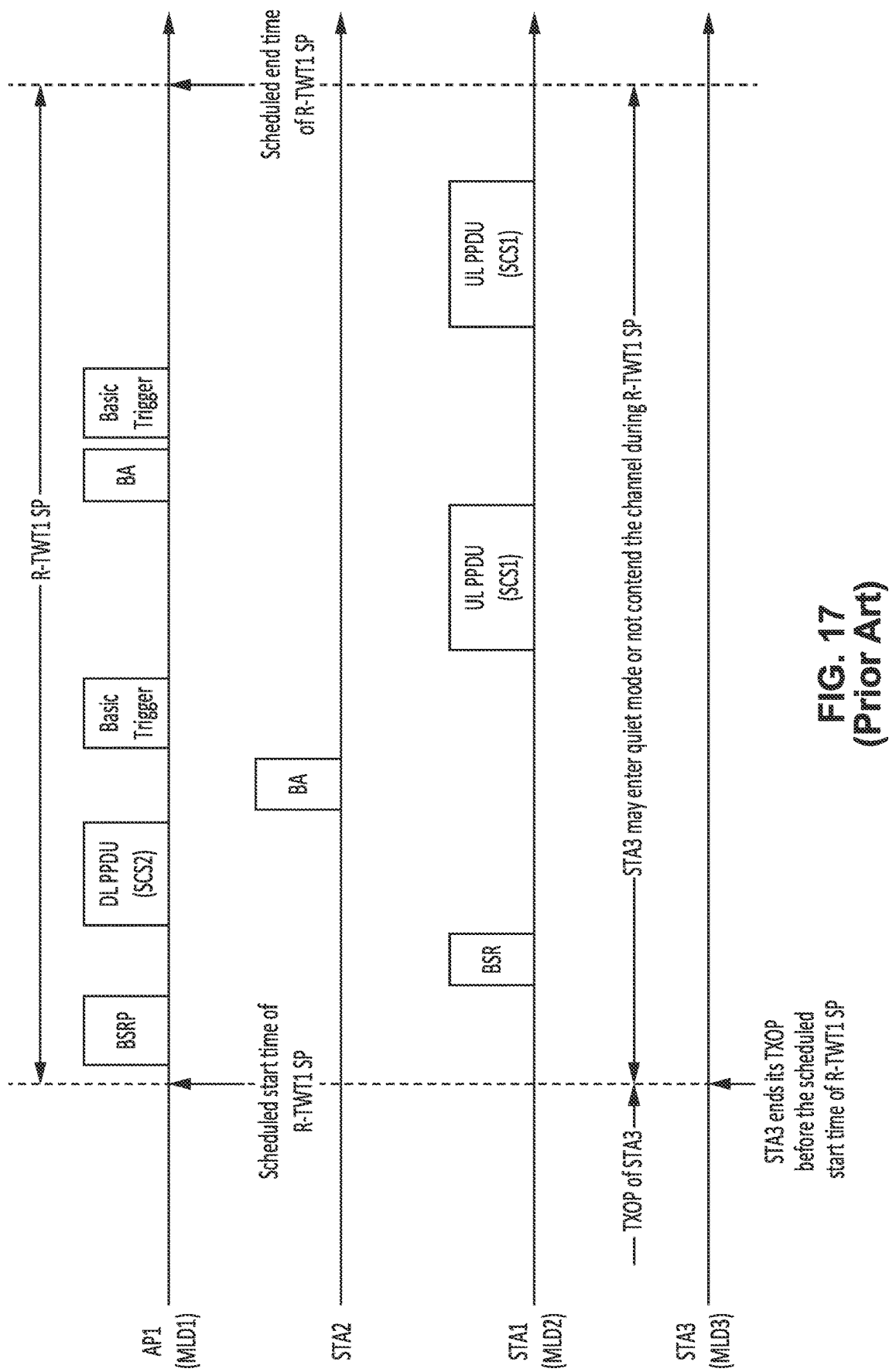
FIG. 17 is a communications diagram of an example of scheduling in a R-TWT SP.

FIG. 17 depicts an example of scheduling in a R-TWT SP. AP1 is a R-TWT scheduling AP which announces R-TWT1 scheduling and manages the members of R-TWT1. STA1 and STA2 are the member STAs of R-TWT1. During the R-TWT1 SP, AP1 schedules and prioritizes the frame exchange with member STAs (e.g., UL PPDU of SCS1 with STA1 and DL PPDU of SCS2 with STA2). STAs which can receive (hear) and recognize (understand) R-TWT scheduling are called R-TWT scheduled STAs. STA3 is a R-TWT scheduled STA, but not a member STA of R-TWT1. STA3 has to end its TXOP before the start time of R-TWT1 SP. STA3 can also enter quiet mode, or otherwise not contend for the channel during R-TWT1 SP. The scheduling AP can broadcast a quiet element to announce a quiet interval during a R-TWT SP, and the STA receiving (hearing) this element may enter quiet mode.

1.4. Multi-User Transmission

Multi-user transmission is available in wireless networks, such as IEEE 802.11. Since IEEE 802.11ax, the network supports the multi-user transmission in both uplink and downlink. Multi-user transmission in IEEE 802.11ax includes MIMO mode and OFDMA modes, which can be utilized separately or together. IEEE 802.11ax uses multi-user transmission packet formats, such as shown in FIG. 18 and FIG. 19, to transmit data in multi-user mode. When multiple users transmit or receive a multi-user transmission packet, all the users share the same Physical Layer Convergence Procedure (PLCP) header of the multi-user transmission packet. Then, each user transmits or receives the data carried by the multi-user transmission packet using separate resource blocks, such as including resource unit (RU) allocation, Modulation Coding Scheme (MCS) and similar.

IEEE 802.11ax defines multiple PLCP Protocol Data Unit (PPDU) formats to transmit packets in different multi-user transmission scenarios, depicted in the following.

FIG. 18 depicts a High Efficiency (HE) multi-user (MU) PPDU format used for downlink multi-user transmission. HE-SIG-B field provides the separate resource block allocation information to each user. The HE-MU element is shown with the following subfields: L-STF, L-LTF, L-SIG, RL-SIG, HE-SIG-A, HE-SIG-B, HE-STF, HE-LTFs, Data and PE.

FIG. 19 depicts a HE Trigger-based (TB) PPDU format used for uplink multi-user transmission. The fields in the HE TB PPDU format are identical to those in the HE single user PPDU format, except that the HE-STF field is 8 microseconds in length.

FIG. 20 depicts the content of the trigger frame. A Frame Control field indicates the type of the frame. A Duration field contains Network Allocation Vector (NAV) information used for CSMA/CA channel access. A RA field contains an address for the recipient of the frame. A TA field contains the address of the STA that transmitted the frame. A Common Info field includes the information for all allocated STAs, which is shown in FIG. 21. A User Info field includes the information for each STA, which is shown in FIG. 22. The Common Info field and the User Info field provide the separate resource block allocation information to each user.

FIG. 21 depicts the subfields in the Common Information field of FIG. 20, and has the following subfields: Trigger Type, Length, Cascading Indication, CS Required, BW, GI and LTF Type, MU MIMO LTF Mode, Number of HE-LTF Symbols, STBC, LDPC Extra Symbol Segment, AP TX Power, Packet Extension, Spatial Reuse, Doppler, GI and LTF Type, HI-SIG-A Reserved, Reserved, and Trigger Dependent User Information.

FIG. 22 depicts the subfields of the User Information Field seen in FIG. 20, and has the following subfields: AID12, RU Allocation, Coding Type, MCS, DCM, SS Allocation, Target RSSI, Reserved and Trigger Dependent User Information.

The trigger frame of FIG. 20 can be transmitted as a multi-user block Ack request (MU-BAR) by setting the trigger type in the common info field to "2". When the trigger frame is MU-BAR, the content of the trigger dependent user info field (as shown in FIG. 22) in the trigger frame is as shown in FIG. 23.

FIG. 23 depicts a Trigger dependent user info field in the trigger frame for the MU-BAR, and showing BAR Control and BAR Information fields.

FIG. 24 depicts the contents of the block Ack frame having the following fields. A Frame Control field indicates the type of frame. A Duration field contains NAV information used for CSMA/CA channel access. A RA field contains an address for the recipient of the frame. A TA field contains the address of the STA that transmitted the frame. A BA Control field indicates the policy of the block Ack. A BA info field contains feedback for the transmission.

Figure 25:
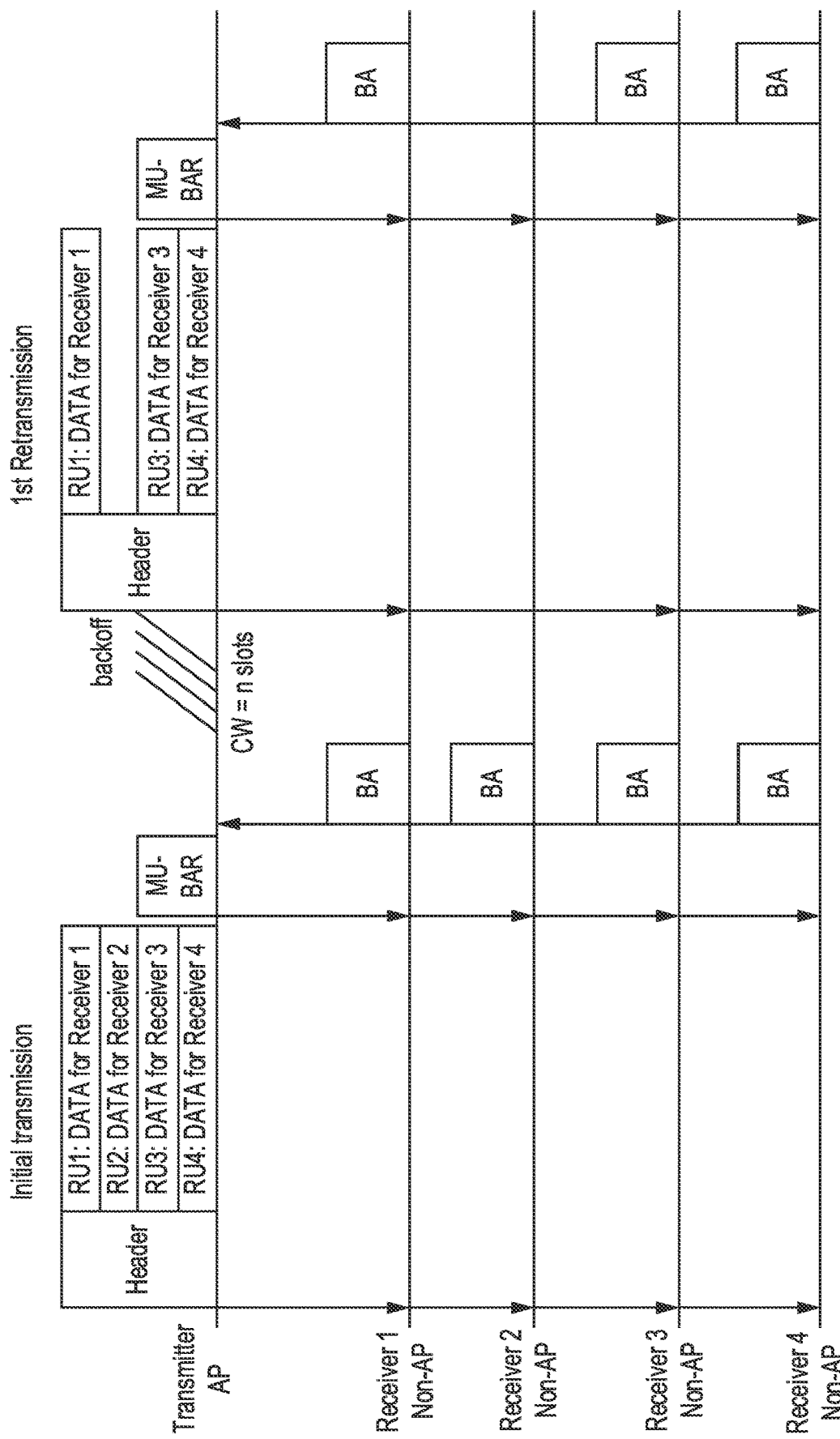
FIG. 25 is a communications diagram of an example of downlink multi-user transmission using Orthogonal Frequency Division Multiple Access (OFDMA).

FIG. 25 depicts an example of downlink multi-user transmission using Orthogonal Frequency Division Multiple Access (OFDMA). The transmitter AP transmits data to its receivers 1, 2, 3, and 4 using the HE MU PPDU format. After finishing the initial transmission, the AP sends a multi-user Block Ack request (MU-BAR) to all the receivers. The receivers then send block Ack (BA) back to the AP. According to the content in the BAs, the AP decides to retransmit the packets to receiver 1, 3, and 4. It then contends for the channel and waits the backoff time. The first retransmission occurs after the AP gains channel access.

Figure 26:
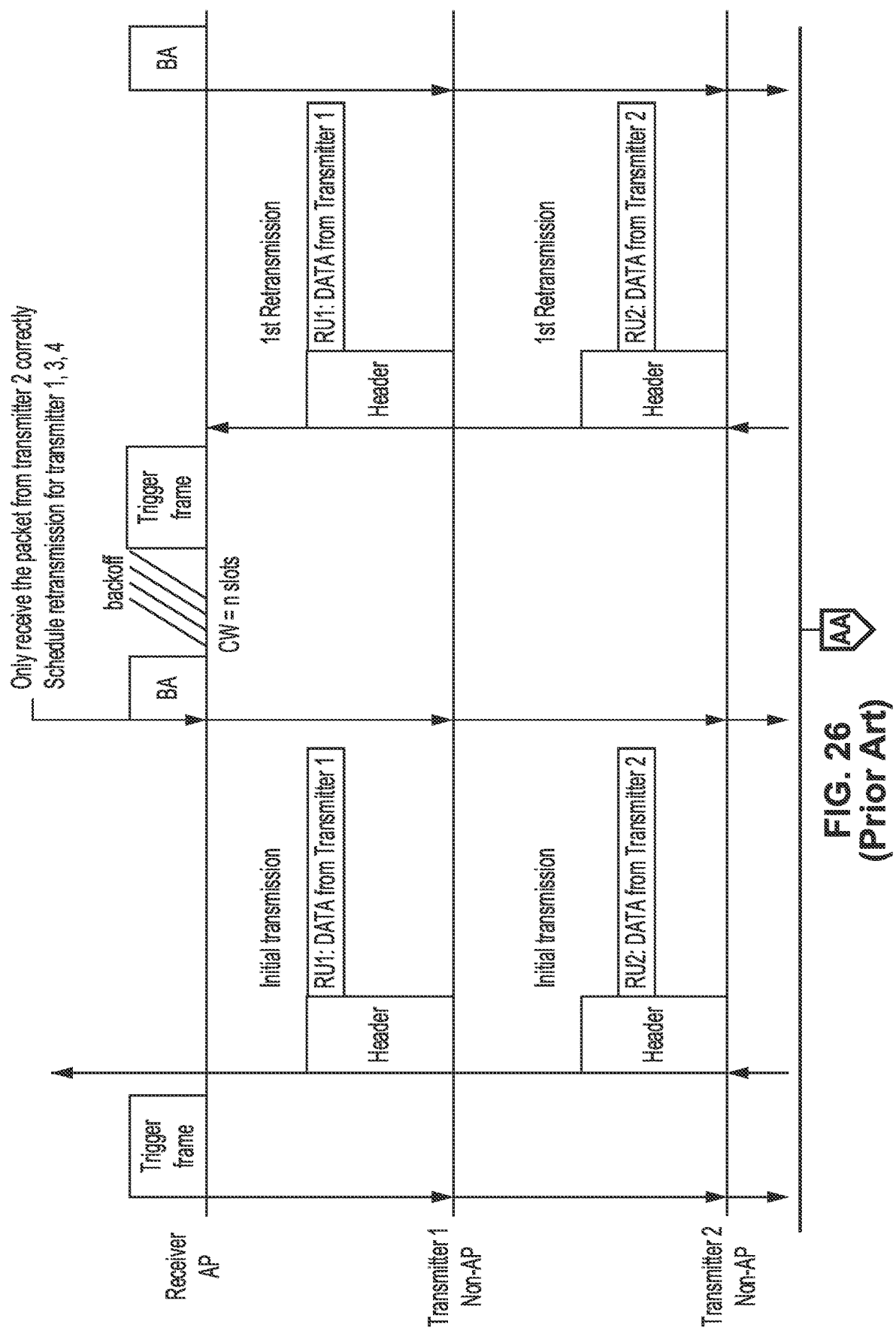
FIG. 26 and FIG. 27 is a communications diagram of an example of uplink multi-user transmission using OFDMA.
Figure 27:
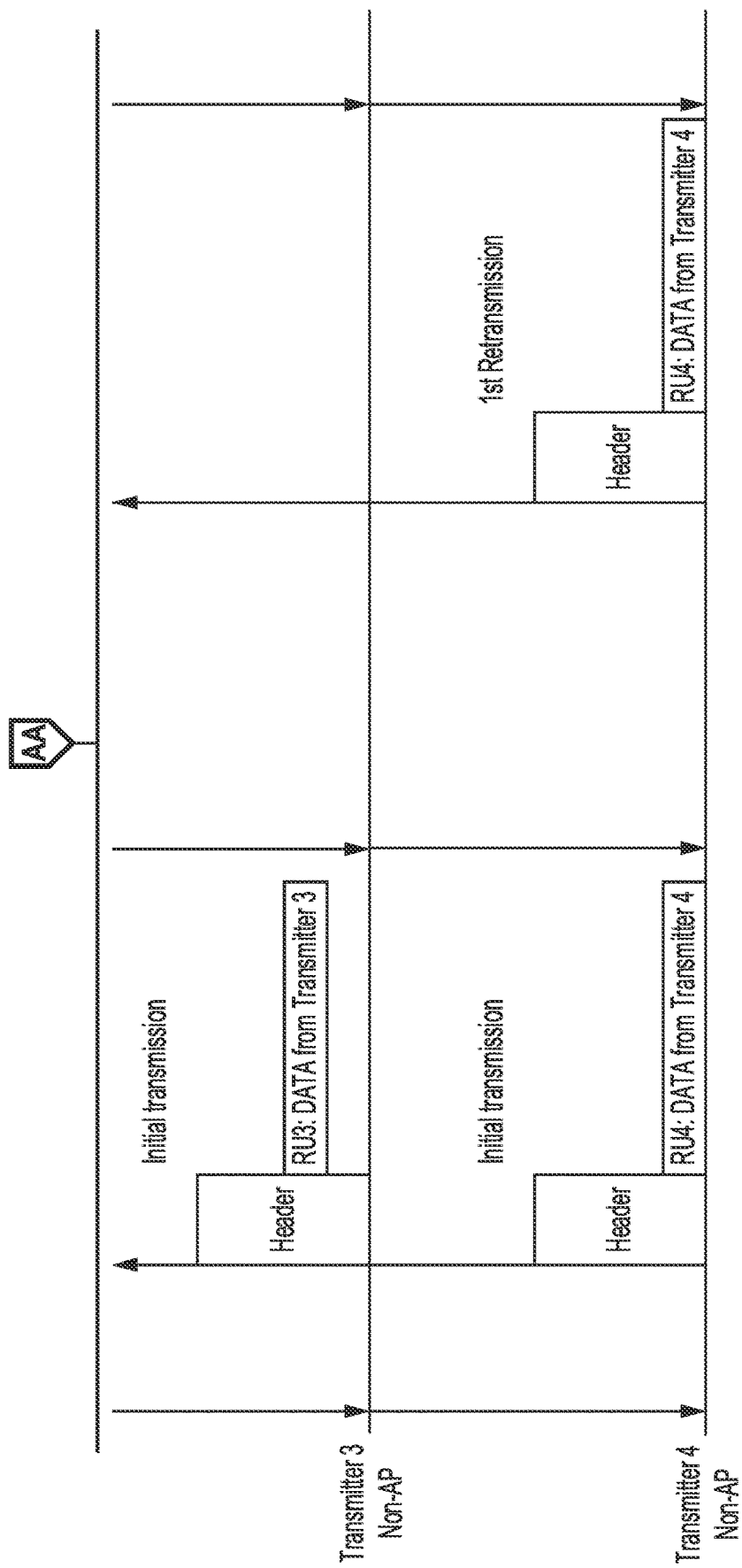

FIG. 26 and FIG. 27 depict an example of uplink multi-user transmission using OFDMA. The AP first sends a trigger frame to all the transmitters 1, 2, 3, and 4. The transmitters receive the trigger frame and start the initial transmission using the resource block allocated by the trigger frame. The multi-user transmission packet uses the HE-TB PPDU format. The AP receives the packet from the transmitters and sends a BA frame to report the correctness of the transmission. In this specific example, only the packet carrying the data from transmitter 2 is received correctly; and thus, retransmission needs to be scheduled for transmitters 1, 3, and 4. The AP contends for the channel and waits the backoff time to gain channel access. Then, the retransmission proceeds in the same manner as the initial transmission.

2. Problem Statement

The current R-TWT scheme only uses the broadcast frame for R-TWT announcements. However, this can create the following problems, especially when R-TWT scheduling is utilized for channel reservations on latency sensitive traffic.

It will be noted that the latest R-TWT announcements may not reflect the latest status of its R-TWT member STAs. The R-TWT scheduling AP does not collect the information from the R-TWT member STAs which may affect R-TWT scheduling. The consequence is that the announced R-TWT schedule may not satisfy the requirement of its R-TWT member STAs, such as the QoS requirements of latency sensitive traffic of the R-TWT member STAs.

The R-TWT announcement often is only broadcast by a beacon frame, especially when there are STAs operating in power saving mode. However, latency sensitive traffic may require scheduling multiple R-TWT SPs during a beacon interval to satisfy its QoS requirement, such as latency, jitter, and packet loss. When the characteristic and the QoS requirement of the latency sensitive traffic changes, the R-TWT scheduling should be adjusted and announced quickly to satisfy the QoS requirement of latency sensitive traffic.

When the R-TWT scheduling AP broadcasts the R-TWT announcement, it can be important to assure that the change in R-TWT scheduling is received by its R-TWT member STAs successfully. However, the broadcast frame is not configured to allow the intended receiver of the broadcast frame to send acknowledgement or feedback in response to the broadcast frame.

3. Contribution of the Present Disclosure

By utilizing the proposed technologies, the R-TWT scheduling AP can transmit a R-TWT trigger frame to request updates related to R-TWT scheduling from the R-TWT scheduled STAs and announce the new R-TWT scheduling quickly. This allows the R-TWT scheduling AP to react quickly to this change in the network environment and optimize its R-TWT scheduling for efficient, stable, and robust performance.

Figure 40:
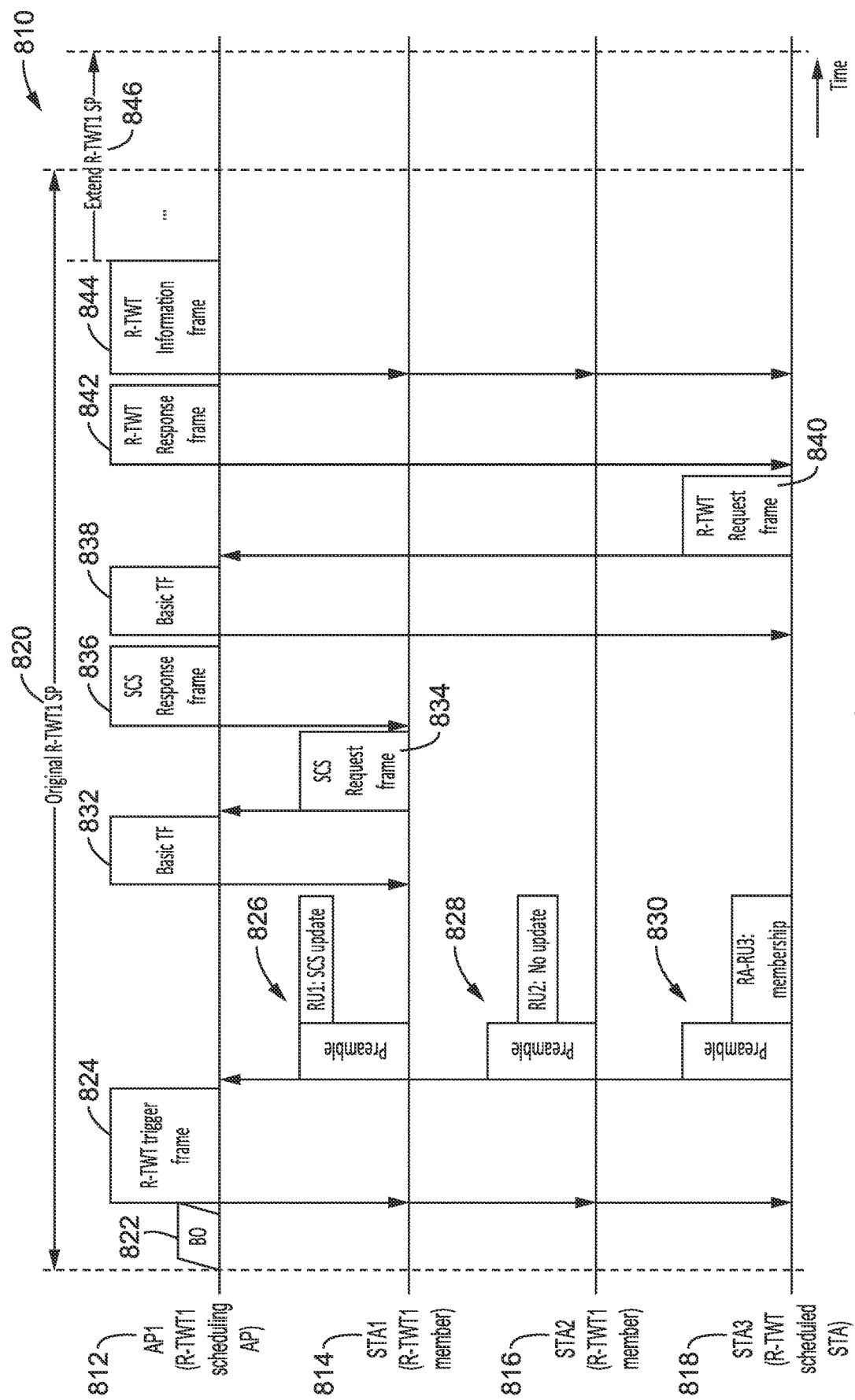
FIG. 40 is a communications diagram of an AP sending an R-TWT trigger frame to request R-TWT related updates from non-AP STAs, according to at least one embodiment of the present disclosure.

The R-TWT trigger frame can be transmitted at any time. For example, the R-TWT trigger frame is transmitted at the beginning of the R-TWT SP to collect information from the R-TWT scheduled STAs which may affect the R-TWT scheduling. Another example (as shown in FIG. 40) can be that the R-TWT scheduling AP is aware that some member STAs are dozing (asleep) for several beacon interval and do not wake up for the beacon, then the R-TWT scheduling AP should initiate the update of the parameters when needed and check on those STAs to see if any updates are needed as well.

The R-TWT trigger frame can ask the R-TWT member STAs to report whether they have information that is related to an R-TWT scheduling update. According to the feedback from the R-TWT members, the R-TWT scheduling AP arranges the transmissions for the information updates.

The R-TWT trigger frame can allocate Recipient Address (RA) Resource Units (RUs) in the frame so that the R-TWT scheduled STAs can request R-TWT membership through the RA-RU.

The R-TWT trigger frame can broadcast the R-TWT scheduling and request acknowledgement from the R-TWT member STAs at the same time. The R-TWT trigger frame can allocate the RUs to those STAs which the R-TWT scheduling AP requests to send acknowledgement.

4. Embodiments 4.1. Communication Station (STA and MLD) Hardware

Figure 28:
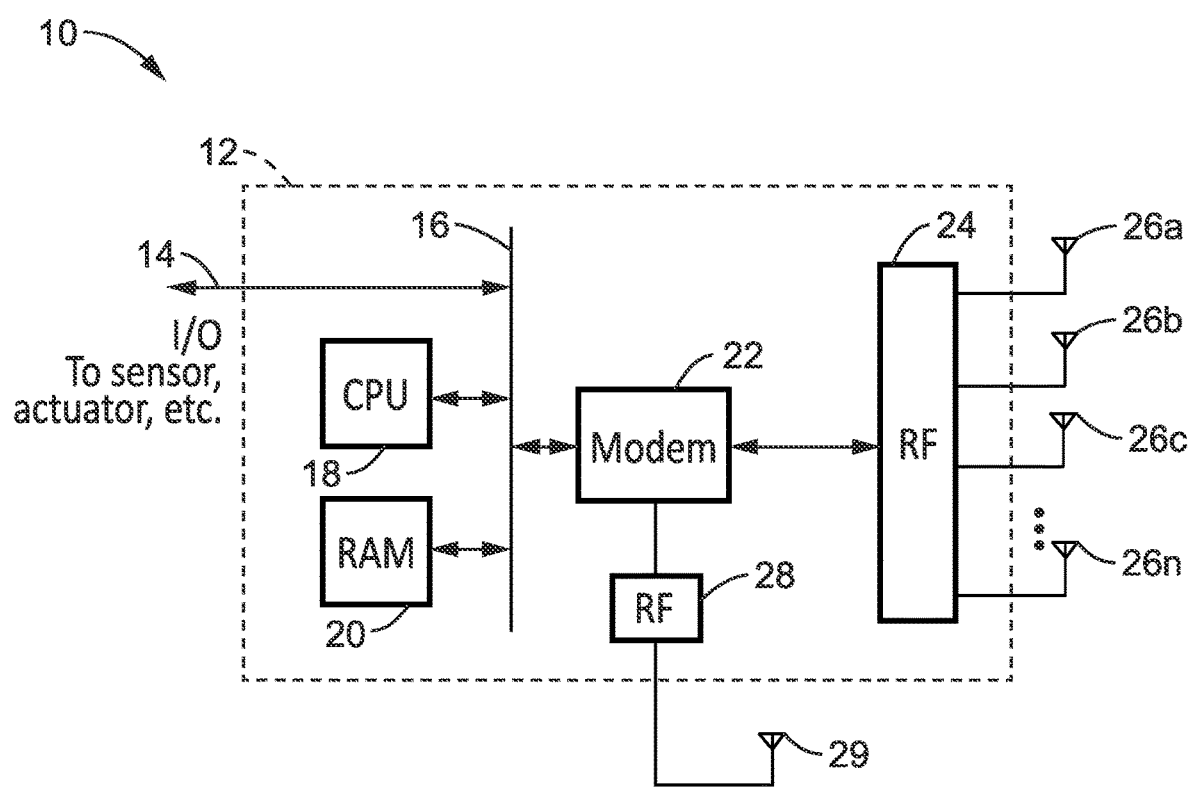
FIG. 28 is a block diagram of communication station hardware, according to at least one embodiment of the present disclosure.

FIG. 28 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26*a*, 26*b*, 26*c* through 26*n*. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 29:
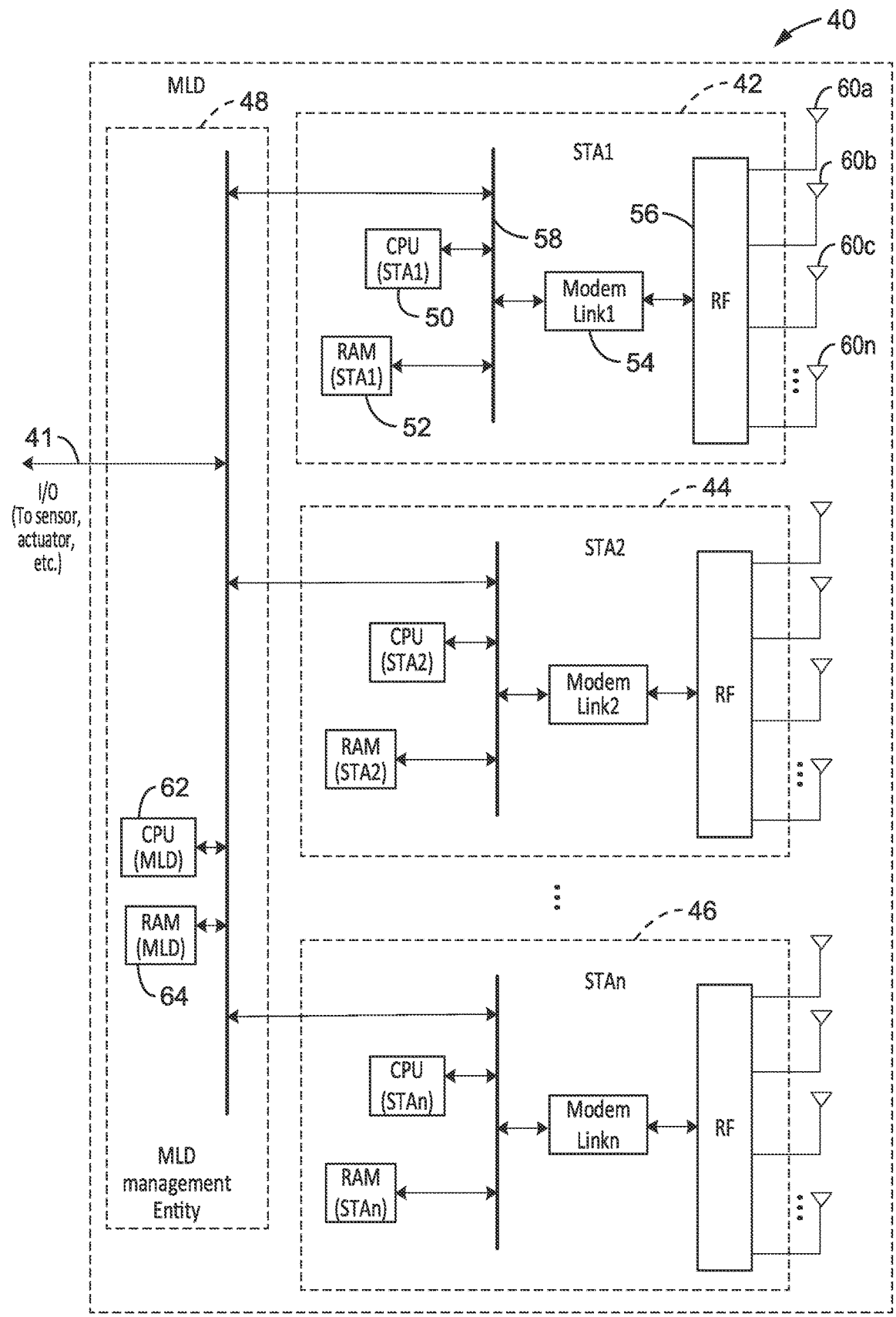
FIG. 29 is a block diagram Multi-Link Device (MLD) hardware according to at least one embodiment of the present disclosure.

FIG. 29 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA1 42, STA2 44 through to STA_N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60*a*, 60*b*, 60*c* through 60*n*, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. Network STA Topology Under Consideration

Figure 30:
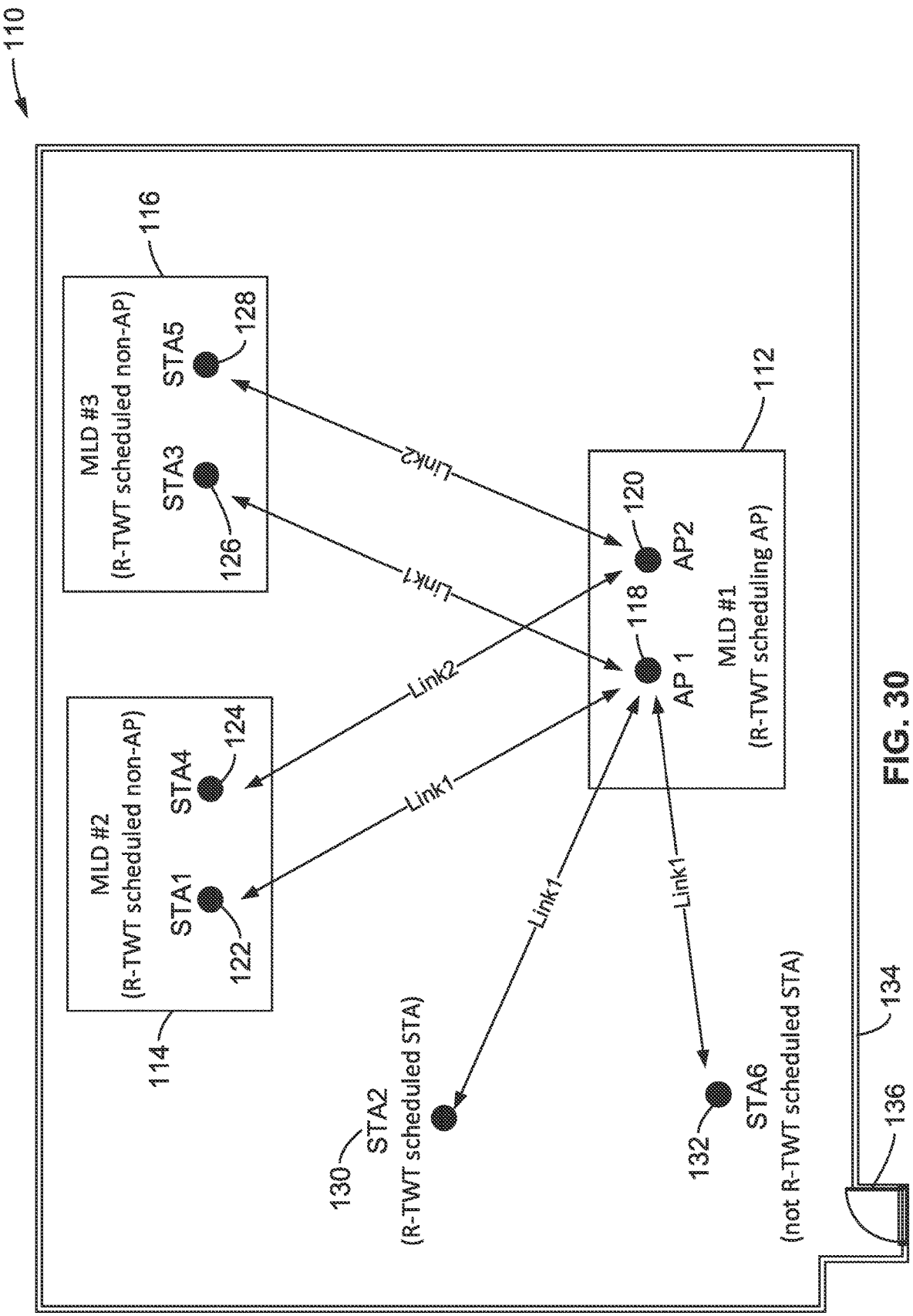
FIG. 30 is a network topology diagram under consideration in the communication examples utilized according to at least one embodiment of the present disclosure.

FIG. 30 illustrates an example embodiment 110 of a Network topology under consideration in these examples. The figure is provided to aid in the discussions of the techniques involved towards engendering an improved understanding of the proposed technology. It should be appreciated that the present disclosure is in no way limited to the topology of this example, as the protocol may be utilized on communications between WLAN STAs and MLDs of any desired topology.

To better explain the goal of the proposed technology, let us set a network scenario. A MLD is a device that has more than one affiliated STAs and has one MAC service access point (SAP) to logical link control (LLC), which includes one MAC data service. An MLD is an AP MLD if APs are affiliated with that MLD. An MLD is non-AP MLD if non-AP STAs are affiliated with that MLD.

As shown in FIG. 30, the example assumes there are 6 STAs consisting of 3 MLDs 112, 114, and 116 in an area 134, (e.g., a meeting room, which may have apertures (doors) 136). AP1 118 and AP2 120 are affiliated with multi-link device (MLD) #1 112, STA1 122 and STA4 124 are affiliated with MLD #2 114, and STA3 126 and STA5 128 are affiliated with MLD #3 116. STA2 130 can be a non-AP STA operating on Link1 or a single link MLD (i.e., a special MLD which only has one STA and operates on one link). STA6 132 can be a non-AP STA operating on Link1 or a single link MLD, and is exemplified here as not being a R-TWT scheduled STA. STA1, STA2, and STA3 are associated with AP1 over Link1 and STA4 and STA5 are associated with AP2 over Link2. All STAs use EDCA for random channel access on all the links.

A R-TWT scheduling AP is able to schedule and announce R-TWTs. A R-TWT scheduled STA is the non-AP STA that is able to receive and recognize the R-TWT announcement from the R-TWT scheduling AP and support R-TWT operations. A R-TWT scheduled STA is able to negotiate membership of a R-TWT with the R-TWT scheduling AP. When a R-TWT scheduled STA becomes a member STA of a R-TWT, the traffic (e.g., UL, DL, P2P) of the R-TWT scheduled STA (i.e., the R-TWT member STA) is scheduled and prioritized to transmit during the SPs of that R-TWT. AP1 and AP2 are the R-TWT scheduling APs; while STA1 through STA5 are R-TWT scheduled STAs. STA6 is not a R-TWT scheduled STA.

4.3. Performing a Quick R-TWT Update

This section introduces how an R-TWT scheduling AP can update R-TWT scheduling quickly with its R-TWT scheduled STAs. The disclosed technology uses a mechanism for triggering and passing information in these update communications, in at least one embodiment a new type of trigger frame is created for this purpose, denoted as a R-TWT trigger frame, that the R-TWT scheduling AP can use to collect R-TWT related updates from its R-TWT scheduled STAs, announce the latest R-TWT scheduling, and request acknowledgements from the R-TWT member STAs in response to the R-TWT announcement.

When the R-TWT scheduling AP announces R-TWT scheduling, the R-TWT scheduling should reflect the latest updates from the R-TWT scheduled STAs so that the R-TWT scheduling can provide a higher quality of service to satisfy the QoS requirement of the R-TWT member STAs. Therefore, before the R-TWT scheduling AP announces the latest R-TWT scheduling, it can send a R-TWT trigger frame to request from (ask) the R-TWT member STAs as well as other R-TWT scheduled STAs to report whether they have any updates related to the R-TWT.

After the R-TWT scheduling AP collects all the updates related to the R-TWT from the R-TWT scheduled STAs, it may need to adjust R-TWT scheduling and announce the updated R-TWT scheduling to all its associated STAs. In this case, the R-TWT scheduling AP can also send a R-TWT trigger frame to broadcast its updated R-TWT scheduling. In the R-TWT trigger frame, the R-TWT scheduling AP can specify which STAs should send an Ack in response to the R-TWT trigger frame. For example, the R-TWT scheduling AP should request all the R-TWT member STAs to respond with the Ack so that the R-TWT scheduling AP can determine (know) that all the R-TWT member STAs have received the latest R-TWT scheduling successfully. This is important especially when the R-TWT scheduling AP needs to change the R-TWT scheduling dynamically; and assures that all the R-TWT member STAs can follow the timing of the latest R-TWT scheduling.

In at least one embodiment/mode/option the R-TWT trigger frame can be transmitted at any time, or restricted to be inside the R-TWT SP only.

In at least one embodiment/mode/option it may be required that the first frame that the R-TWT scheduling AP is to transmit during the R-TWT SP is a R-TWT trigger frame except some control frames, such as (MU) Ready-To-Send/Clear-To-Send (RTS/CTS), trigger frame/Power-Save Polling (PS Poll), trigger frame/QoS null. This may be mandatory for all R-TWT SPs or for R-TWT SPs which have member STAs operating in power saving mode.

In at least one embodiment/mode/option the R-TWT scheduling AP may have to collect information updates related to a R-TWT before the data frames are exchanged during the SP of that R-TWT.

In at least one embodiment/mode/option during an R-TWT SP, the R-TWT scheduling AP can only transmit R-TWT trigger frames to collect updates related to the R-TWT of the current SP.

In at least one embodiment/mode/option during an R-TWT SP, the R-TWT scheduling AP can transmit a R-TWT trigger frame to announce future R-TWT scheduling and terminate the current R-TWT SP.

The R-TWT trigger frame is a new type of trigger frame. For example, a reserved value in the trigger type subfield of the Common Info field of the trigger frame can be used to indicate the trigger frame is a R-TWT trigger frame.

4.3.1. Process Flow Diagrams

Figure 31:
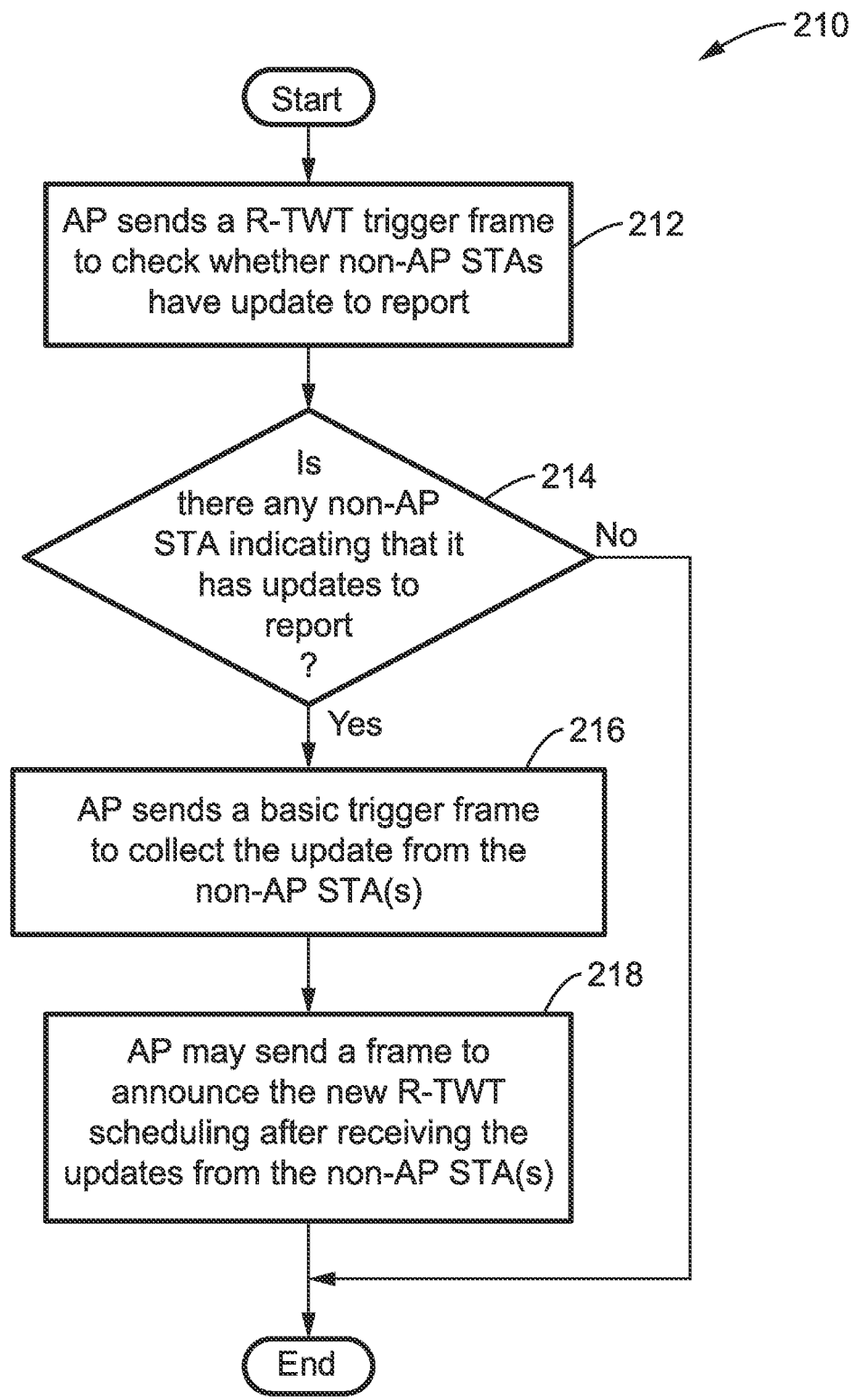
FIG. 31 is a flow diagram of the AP requesting R-TWT related updates from non-AP STAs, according to at least one embodiment of the present disclosure.
Figure 36:
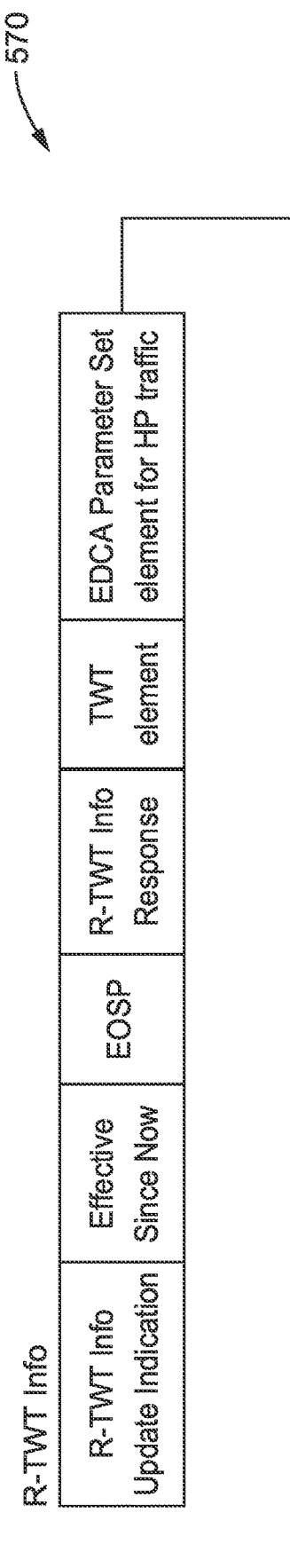
FIG. 36 is a data field diagram of an R-TWT Information field according to at least one embodiment of the present disclosure.

FIG. 31 illustrates an example embodiment 210 of the AP requesting R-TWT related updates from non-AP STAs. The format of the R-TWT trigger frame is shown as in FIG. 36.

The AP (R-TWT scheduling AP) sends 212 a R-TWT trigger frame to check whether the non-AP STAs have an update to report. In the R-TWT trigger frame, the AP can allocate a resource unit (RU) to an individual STA so that the individual STA can use the RU to report whether it has R-TWT related information to update with the AP. For example, the AP can add a user info field with AID12 field set to the AID12 of an individual STA in the R-TWT trigger frame to indicate an RU for that individual STA reporting any updates of the information related to the R-TWT. It should be noted that the RU may only be assigned to a R-TWT member STA.

In the R-TWT trigger frame, the AP can allocate a Random Access resource unit (RA-RU) as defined in IEEE 802.11ax to request if any STAs has a R-TWT related information to update with the AP. The AID12 field of the user info field corresponding to an RA-RU can be set to 0 to indicate that any associated STA could contend to use the RA-RU to indicate that it has updates to share with the AP. It is also possible that the AID12 field is set to a special value or a group ID to indicate that only the R-TWT scheduled STA can use the RA-RU.

At check 214 it is determined if there is any non-AP STA indicating that it has R-TWT related information to update with the AP. If the condition is not met, then processing ends. Otherwise, then at block 216 the AP can arrange a transmission to share updates between the non-AP STA and the AP. For example, the AP can send a basic trigger frame to collect the updates from the non-AP STAs. The non-AP STA which receives the basic trigger frame then sends a frame carrying its updates to the AP.

If all the non-AP STAs indicate that they do not have R-TWT related information to update with the AP, then the AP does not arrange the transmission to share the updates between the non-AP STA and the AP.

Figure 33:
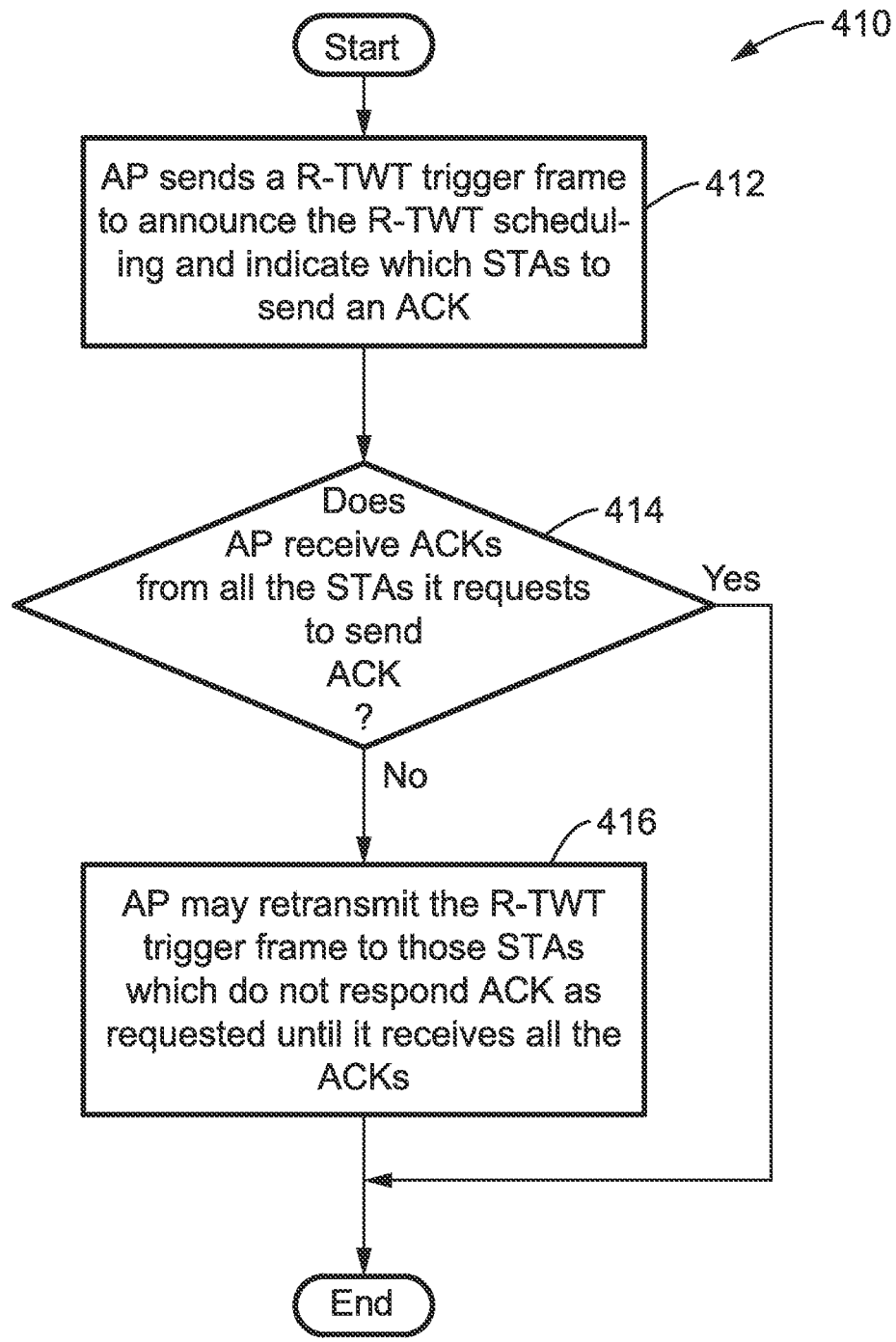
FIG. 33 is a flow diagram of an AP sending a R-TWT trigger frame to announce R-TWT scheduling and requesting Ack, according to at least one embodiment of the present disclosure.
Figure 35:
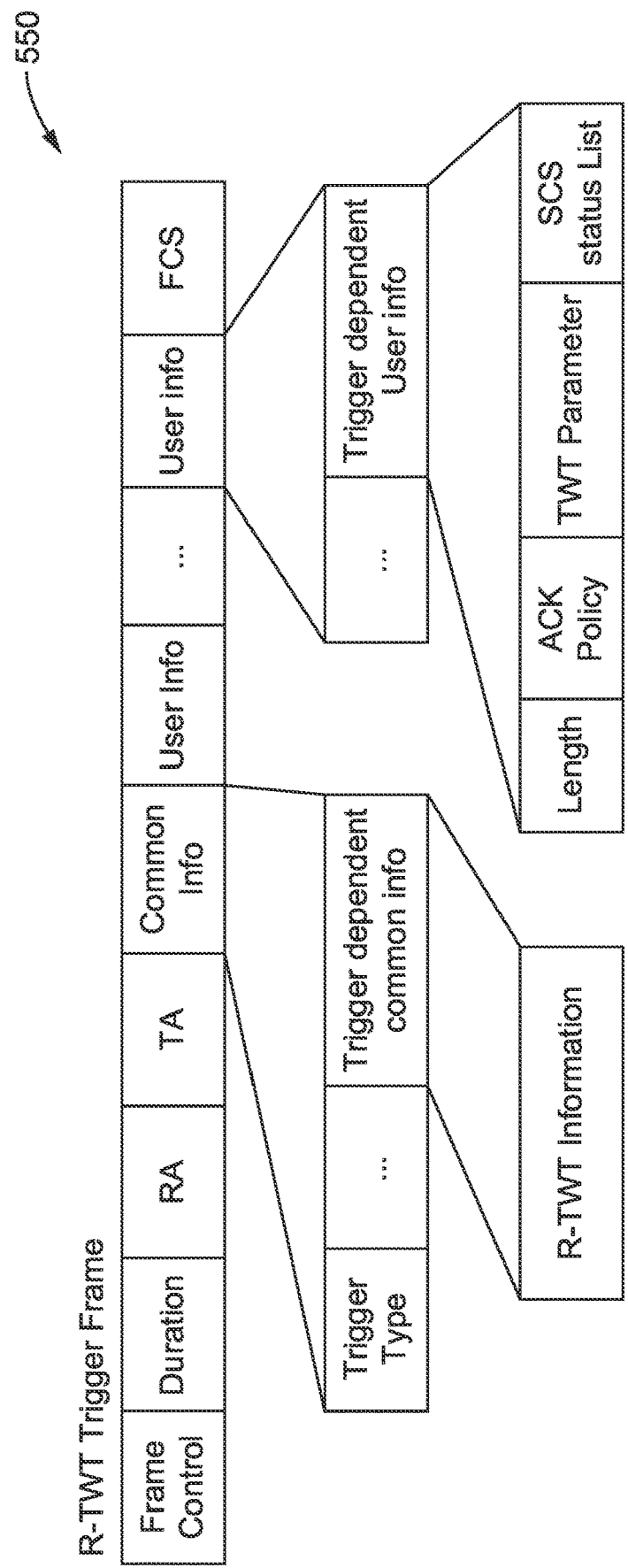
FIG. 35 is a data field diagram of an R-TWT Trigger frame according to at least one embodiment of the present disclosure.

Otherwise, if there are updates the AP can send a R-TWT announcement frame 218 to share the new R-TWT scheduling with all the non-AP STAs. It should be noted that in at least one embodiment/mode/option, the AP does not send an R-TWT announcement if there is no change in R-TWT scheduling. The format of the frame carrying the R-TWT announcement can be a R-TWT trigger frame as shown in FIG. 35 or a R-TWT information frame as shown in FIG. 38. The procedure of the AP using a R-TWT information frame to announce the R-TWT scheduling is shown in FIG. 33.

Figure 32:
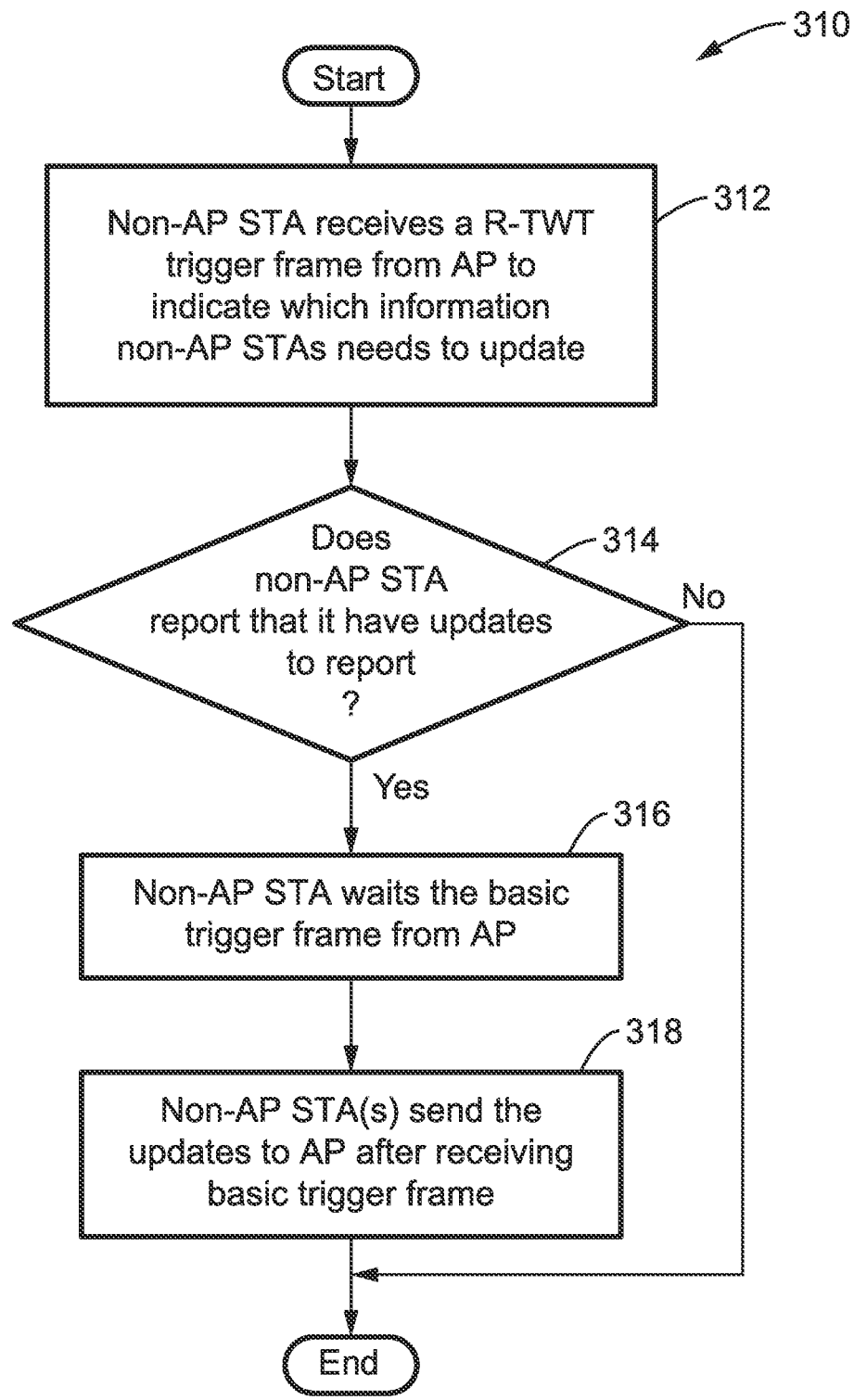
FIG. 32 is a flow diagram of a non-AP STA sending R-TWT related updates to the AP, according to at least one embodiment of the present disclosure.

FIG. 32 illustrates an example embodiment 310 of a non-AP STA sending R-TWT related updates to the AP. The format of the R-TWT trigger frame is shown as in FIG. 35.

After the non-AP STAs receives 312 the R-TWT trigger frame, they send frames to indicate which R-TWT related information they need to update with the AP.

The frame sent by non-AP STAs can be a R-TWT update indication frame whose format is shown in FIG. 39. Since the R-TWT related information is carried by the A-control subfield in the HT field of the frame, the R-TWT related information can be transmitted by any frames with an HT field, such as QoS Null frame or QoS data frame, with the HT control field having a similar format as shown in FIG. 39.

It should be noted that the non-AP STAs in this case are the intended receivers of the R-TWT trigger frame. Since each non-AP STA is assigned an RU or RA-RU to send trigger-based transmission, the R-TWT related information of a non-AP STA will be transmitted through the RU or RA-RU that is assigned to it.

At check 314 it is determined if the non-AP STA indicates that it has R-TWT related information to update with the AP. If the condition is not met, then the AP does not arrange the transmission to share the updates between the non-AP STA and the AP and processing ends. Otherwise, the non-AP should wait 316 for the AP to arrange the transmission to share the updates between the non-AP STA and the AP. For example, the AP can send a basic trigger frame to collect the update from the non-AP STAs. The non-AP STA which receives the basic trigger frame then sends 318 a frame carrying its updates to the AP.

FIG. 33 illustrates an example embodiment 410 of an AP sending a R-TWT trigger frame to announce R-TWT scheduling and requesting an Ack. The format of the R-TWT trigger frame is shown as in FIG. 35.

In block 412 the AP sends a R-TWT trigger frame to announce R-TWT scheduling. In the R-TWT trigger frame, the AP indicates which STAs are to send Acks in response to the latest R-TWT scheduling in the R-TWT trigger frame. In at least one embodiment/mode/option the AP must request all member STAs of the R-TWT announced in the R-TWT trigger frame to return Acks.

In the R-TWT trigger frame, the AP can allocate an RU to an individual STA so that the individual STA can use the RU to send an Ack. For example, the AP can add a user info field with AID12 field set to the AID12 of an individual STA in the R-TWT trigger frame to indicate an RU for that individual STA sending Ack in response to the R-TWT trigger frame. It should be noted that the RU may only be assigned to a R-TWT member STA.

In the R-TWT trigger frame, the AP can allocate RA-RU to indicate the information in the R-TWT scheduling is broadcasted to all the STAs. The AID12 field of the user info field corresponding to an RA-RU can be set to "0" or "2045" to indicate that the R-TWT scheduling is shared with associated STAs or unassociated STAs, respectively. It at least one embodiment/mode/option the AID12 field is set to a special value or a group ID to indicate that the R-TWT scheduling is shared with all STAs including associated STAs and unassociated STAs. It should be noted that it is possible to allocate more than one RA-RU with different AID12 fields in a R-TWT trigger frame. For example, one RA-RU is for associated STAs and the other one is for unassociated STAs.

It should be noted that in at least one embodiment/mode/option the AP indicates that information in the R-TWT scheduling is broadcast to all the STAs by setting the RA (or Address1) field in the R-TWT trigger frame to broadcast instead of allocating a RA-RU in the user info field.

At check 414 it is determined if the AP receives Acks from all the non-AP STAs which are requested to send Acks in the R-TWT trigger frame. If the condition is not met, then processing ends. Otherwise, at block 416 the AP can retransmit the R-TWT trigger frame and request those non-AP STAs which do not respond to the Ack as requested until it receives all the Acks.

Figure 34:
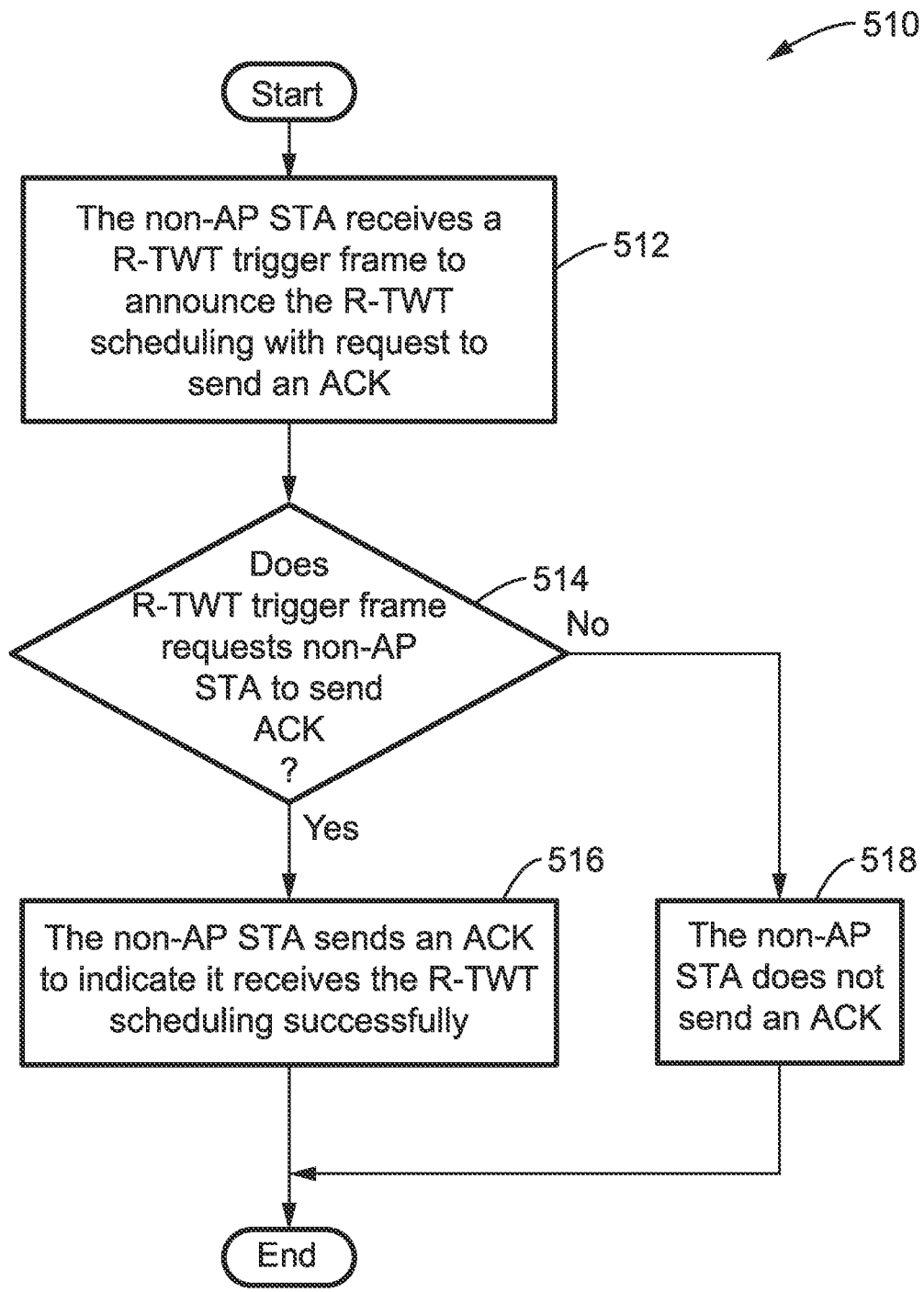
FIG. 34 is a flow diagram of a non-AP STA sending an Ack in responding to a R-TWT trigger frame announcing R-TWT scheduling, according to at least one embodiment of the present disclosure.

FIG. 34 illustrates an example embodiment 510 of a non-AP STA sending an Ack in responding to a R-TWT trigger frame announcing R-TWT scheduling. The format of the R-TWT trigger frame is shown as in FIG. 35.

When the non-AP STA receives a R-TWT trigger frame and is requested to respond with an Ack, it sends an Ack through the RUs allocated by the R-TWT trigger frame to indicate the R-TWT trigger frame was received successfully. If the non-AP STA is the intended receiver of the R-TWT trigger frame, but it is not requested to send an Ack, then it does not respond with an Ack.

More particularly, at block 512 the non-AP STA receives a R-TWT trigger frame to announce the R-TWT scheduling, and which can include a request to send an Ack. A check 514 determines if the R-TWT trigger frame requests the non-AP STA to send an Ack.

If the condition is not met, then at block 518 the non-AP STA does not send an Ack. Otherwise, at block 516, the non-AP STA sends an Ack to indicate it has received the R-TWT scheduling successfully.

4.3.2. Frame Format

This section illustrates the format of R-TWT trigger frame. Additionally, this section shows the format of a R-TWT information frame which both AP and non-AP STA can utilize to request and report R-TWT related updates and the format of a R-TWT update indication frame which the transmitter can utilize to indicate that it has R-TWT related information to update with the receiver of the frame.

FIG. 35 illustrates an example embodiment 550 of an R-TWT trigger frame, having the following fields.

A frame Control field indicates the type of the frame. A Duration field contains NAV information used for CSMA/CA channel access. A RA field contains an address indicating the recipient of the frame. A TA field contains the address of the STA that transmitted the frame.

A Common Information field can use a format identical to those in the trigger frame as shown in FIG. 21 except for the following. The trigger type is set to indicate the trigger frame is R-TWT trigger frame and the format of the Trigger dependent common info field.

The Trigger Dependent common info field carries R-TWT information field in a R-TWT trigger frame. An example format of R-TWT information field is shown in FIG. 36. The R-TWT scheduling AP sets this field to indicate the purpose of sending this R-TWT trigger frame, such as requesting R-TWT related updates from non-AP STAs or to announce R-TWT scheduling.

If this field indicates that the AP requests R-TWT related updates, then the intended receivers of the R-TWT trigger frame send a frame back through the corresponding RUs indicated in the user info field to indicate which R-TWT related information it needs to update with the AP.

If this field indicates an AP announcement of R-TWT scheduling in the R-TWT trigger frame, then the intended receivers should update and follow the R-TWT scheduling as shown in the R-TWT trigger frame. The intended receiver sends an Ack back to confirm that it has received the R-TWT scheduling correctly if requested by the R-TWT trigger frame.

The format of the User info field in a R-TWT trigger frame, in at least one embodiment, can be identical to those in the trigger frame as shown in FIG. 22 except for the following.

Trigger dependent user info field in a user info field carries the information to the intended receiver as indicated in the AID12 field of the same user info field. The Trigger dependent user info field contains the fields outlined below.

A Length field is set to indicate the length of the Trigger dependent User Info field.

An Ack Policy field is set by the AP to indicate whether the intended receiver of the user Info field is required to send an Ack or not. The ACK policy can by addressed by using a one-bit indication. When this field is set to a first state (e.g., "1"), then the intended receiver of this field should send an Ack immediately after receiving the R-TWT trigger frame through the RU allocated by the R-TWT trigger frame. Otherwise, this field is set to a second state (e.g., "0") and the intended receiver of this field does not respond with an Ack after receiving the R-TWT trigger frame. It should be noted that this field is set to the second state (e.g., "0") when the user info field is set for multiple users (e.g., AID12 field of the user info field is set to "0" or "2045").

A TWT Parameter field in at least one embodiment can be the same as the TWT element shown in FIG. 5 with no element ID field. The AP sets this field to manage the R-TWT membership of the intended receiver of this field. The AP can set the TWT Parameter field to indicate whether it accepts or rejects the membership of the intended receiver of this field with the corresponding TWT parameter settings. The parameter setting of the TWT Parameter field can be identical/similar to the TWT element in a TWT response frame as shown in Section 1.3. If the intended receiver becomes a member of the R-TWT, it can participate as a member in the corresponding R-TWT SPs. Otherwise, the intended receiver is not a member of the corresponding R-TWT indicated in the TWT element.

SCS status List field in at least one embodiment can be identical to that shown in FIG. 13. The AP can set this field to manage SCS traffic streams with the intended receiver.

FIG. 36 illustrates an example embodiment 570 of a R-TWT Information field, having the following subfields.

A R-TWT Information Update Indication subfield is set by the transmitter to indicate whether the transmitter has R-TWT related updates to share with the receiver(s). In at least one embodiment, this subfield can be implemented as a one-bit indication. When this indication is set to a first state (e.g., "1"), then the transmitter has R-TWT related updates to share with the receiver(s) and the receiver(s) will receive the R-TWT related updates from the transmitter in the R-TWT Information subfield. For example, when this subfield is set to a first state (e.g., "1"), then the TWT element, and/or the EDCA parameter set element, and/or MU EDCA Parameter Set element will be present in the R-TWT Information subfield. When this indication is set to a second state (e.g., "0"); then the transmitter does not have R-TWT related updates to share with the receiver(s). Then, for example, the TWT element, and EDCA parameter set element, and MU EDCA Parameter Set element will not be present in the R-TWT Information subfield.

Figure 37:
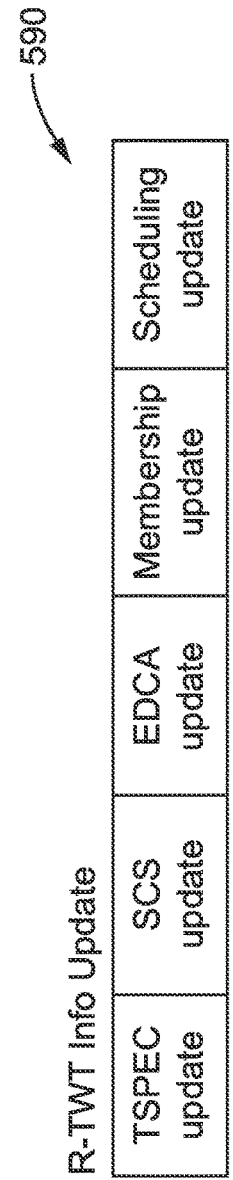
FIG. 37 is a data field diagram of an R-TWT Info Update Indication field according to at least one embodiment of the present disclosure.

Alternatively, in at least one embodiment this subfield can be as shown in FIG. 37. Each bit in this field can be set to indicate which R-TWT related information has updates to share. When one bit is set to a first state (e.g., "1"), then it indicates that the transmitter has the corresponding R-TWT related information to update with the intended receiver. Otherwise, this field is set to a second state (e.g., "0").

An Effective Since Now subfield is set by the R-TWT scheduling AP to indicate whether the R-TWT scheduling indicated in the TWT element takes effect immediately after sending this R-TWT Information field. In at least one embodiment, this subfield can be implemented as a one bit indication. For example, when this field is set to a first state (e.g., "1"), then the R-TWT scheduling indicated in the TWT element will take effect immediately after sending this R-TWT Information field. The receiver STAs should follow the R-TWT scheduling immediately after receiving the R-TWT information field. Otherwise, this field is set to a second state (e.g., "0"). It should be noted that this field can be reserved when the R-TWT information field is transmitted by a non-AP STA or the R-TWT Info update indication field is set to a second state (e.g., "0").

An EOSP field is set by the AP to indicate whether it terminates the current R-TWT SP immediately after sending the R-TWT Information field. When this field is set to a first state (e.g., "1"), then the receiver STAs can recognize (know) that the current R-TWT AP has been terminated. Otherwise, this field is set to a second state (e.g., "0"), and the R-TWT SP continues after sending the R-TWT Information field. The non-AP STA can set this field to indicate whether it has traffic to exchange with the AP during a R-TWT SP. When this field is set to a first state (e.g., "1"), this field indicates that the non-AP STA has no more frames (or UL frames only, or UL and P2P frames only) to exchange with the AP during the R-TWT SP. The AP will not trigger any transmissions from the non-AP STA after receiving this field. Otherwise, the non-AP STA sets this field to a second state (e.g., "0"). It should be noted that this field is only used during the R-TWT SP and is reserved when the R-TWT Information field is sent outside of a R-TWT SP.

A R-TWT Information Response field is set to a first state (e.g., "1") to indicate that when the receiver STA receives this field, the receiver STA should respond with a R-TWT information field as feedback. Otherwise, this field is set to a second state (e.g., "0"). It should be noted that if the R-TWT Information Response field can be reserved when the Effective Since Now field is set to a first state (e.g., "1").

A TWT element in at least one embodiment can have the same format as shown in FIG. 5. The AP sets this element to announce its R-TWT scheduling so that the receivers (e.g., non-AP STAs) can follow the R-TWT scheduling indicated in this field. A non-AP STA sets this element to request membership of a R-TWT and the AP should respond whether it accepts the membership request or not.

An EDCA Parameter Set element for HP traffic field, in at least one embodiment, can be the same as defined in IEEE 802.11. The AP sets this field to indicate the EDCA parameters that the receiver STAs (non-AP STAs) should use for channel contention for latency sensitive traffic during the R-TWT SP.

It should be noted that during the R-TWT setup procedure, the non-AP STA and AP negotiates on which TIDs of traffic are considered as latency sensitive traffic during the R-TWT SPs. This information is indicated in the Restricted TWT Traffic Info field as shown in FIG. 7.

It should be noted that the receiver STAs should use the regular EDCA parameters, such as that received from the beacon frame, outside of the R-TWT SPs.

A MU-EDCA Parameter Set element for HP traffic field, in at least one implementation, can be the same as defined in IEEE 802.11ax. The AP sets this field to indicate the MU-EDCA parameters that the receiver STAs (non-AP STAs) should use to contend for the channel when communicating latency sensitive traffic during the R-TWT SP.

It should be noted that during the R-TWT setup procedure, the non-AP STA and AP negotiate which TIDs of traffic are considered as latency sensitive traffic during the R-TWT SPs. This information is indicated in the Restricted TWT Traffic Info field as shown in FIG. 7.

It should be noted that the receiver STAs should use the regular MU-EDCA parameters (received from the beacon frame) outside the R-TWT SPs.

A EDCA Parameter Set element for LP traffic field, in at least one embodiment, can be the same as defined in IEEE 802.11. The AP sets this field to indicate the EDCA parameters that the receiver STAs (non-AP STAs) should use to contend for the channel when communicating non-latency sensitive traffic during the R-TWT SP.

It should be noted that during the R-TWT setup procedure, the non-AP STA and AP negotiate which TIDs of traffic are considered as latency sensitive traffic during the R-TWT SPs. This information is indicated in the Restricted TWT Traffic Info field as shown in FIG. 7.

It should be noted that the receiver STAs should use the regular EDCA parameters such as received from the beacon frame outside the R-TWT SPs.

A MU-EDCA Parameter Set element for LP traffic field, in at least one implementation, can be the same as defined in IEEE 802.11ax. The AP sets this field to indicate the MU-EDCA parameters that the receiver STAs (non-AP STAs) should use to contend for the channel for the non-latency sensitive traffic during the R-TWT SP.

It should be noted that during the R-TWT setup procedure, the non-AP STA and AP negotiate which TIDs of traffic are considered as latency sensitive traffic during the R-TWT SPs. This information is indicated in the Restricted TWT Traffic Info field as shown in FIG. 7.

It should be noted that the receiver STAs should use the regular MU-EDCA parameters (received from the beacon frame), outside the R-TWT SPs.

A SCS Descriptor element/SCS status List field, in at least one embodiment, can be the SCS Descriptor element as shown in FIG. 12 when it is set by a non-AP STA, or the SCS status list as shown in FIG. 13 when it is set by an AP.

A Non-AP STA sets the SCS Descriptor element to indicate the update of a SCS traffic stream. According to the change of parameters in the SCS Descriptor element, the AP may reconsider the SCS setup with the non-AP STA and adjust the R-TWT scheduling for the SCS traffic stream.

The AP sets the SCS status list to indicate the status of the SCS traffic streams with the receiver, for example non-AP STA. According to the status, the non-AP STA can recognize (knows) whether a new SCS is established or an existing SCS has been torn down by the AP.

In at least one embodiment/mode/option this field is not present when the R-TWT information field is in the trigger dependent common info field in a R-TWT trigger frame.

A TSPEC element field, in at least one embodiment, can be the TSPEC element as shown in FIG. 1. This field is set to indicate the change of the TSPEC parameter setting of a TID. The receiver can adjust the R-TWT scheduling according to TSPEC element. It should be noted that this field can also be a QoS Characteristics element, such as defined in IEEE 802.11 be.

It should be noted that some of the fields in R-TWT Information field are in a format as defined in IEEE 802.11. In at least one embodiment/mode/option these fields do not contain element ID field and/or length field and/or element ID extension field when the R-TWT Information field is used by a control frame.

FIG. 37 illustrates an example embodiment 590 showing the format of the R-TWT Info Update Indication field, having the following fields.

A TSPEC update field is set to indicate whether the transmitter has a change of TSPEC element. In at least one embodiment, this field can be implemented as a one bit indication. When set to a first state (e.g., "1"), it indicates that the transmitter has a change of TSPEC element; otherwise, it is set to a second state (e.g., "0"). When the transmitter sets this field to a first state (e.g., "1") in a R-TWT Information field, then it can also indicate the presence of the TSPEC element in the R-TWT information. Otherwise, the transmitter sets this field to to a second state (e.g., "0").

A SCS update field is set to indicate whether the transmitter has the change of its SCS setup. In at least one embodiment, this field can be implemented as a one bit indication. When it is set to a first state (e.g., "1"), it indicates that the transmitter has, or intends to, change its SCS setup. Otherwise, it is set to a second state (e.g., "0"). When the transmitter sets this field to a second state (e.g., "1") in a R-TWT Information field, then it can also indicate the presence of the SCS Descriptor element in the R-TWT information; otherwise, the transmitter sets this field to a second state (e.g., "0").

An EDCA update field is set to indicate whether the transmitter has a change of EDCA parameter settings during the R-TWT SPs. In at least one embodiment, this can be implemented as a one bit indication. When it is set to a first state (e.g., "1"), it indicates that the transmitter has, or intends to, change EDCA parameter setting during the R-TWT SPs; otherwise, it is set to a second state (e.g., "0"). This field can be set to the first state (e.g., "1") by the AP only. When the transmitter sets this field to a second state (e.g., "1") in a R-TWT Information field, then it can also indicate the presence of the EDCA Parameter Set element for HP traffic, MU EDCA Parameter Set element for HP traffic, EDCA Parameter Set element for LP traffic, and MU EDCA Parameter Set element for LP traffic in the R-TWT information. Otherwise, the transmitter sets this field to a second state (e.g., "0").

A Membership update field is set to indicate whether the transmitter has a change for R-TWT membership. In at least one embodiment, this can be implemented as a one bit indication. When set to a first state (e.g., "1"), it indicates that the transmitter has, or intends to, change its R-TWT membership. Otherwise, it is set to a second state (e.g., "0"). When the non-AP STA sets this field to a first state (e.g., "1") in a R-TWT Information field in an R-TWT information frame, then it can also indicate the presence of the TWT element in the R-TWT information which requests a change of its R-TWT membership. Otherwise, the non-AP STA sets this field to a second state (e.g., "0").

A Scheduling update field is set to indicate whether the transmitter has changed R-TWT scheduling. In at least one embodiment, this can be implemented as a one bit indication. When it is set to a first state (e.g., "1"), it indicates that the transmitter has, or intends to, change its R-TWT scheduling; otherwise, it is set to a second state (e.g., "0"). This field is only set to a first state (e.g., "1") by the AP. When the AP sets this field to a first state (e.g., "1") in a R-TWT Information field, then it can also indicate the presence of the TWT element in the R-TWT information which announces R-TWT scheduling. Otherwise, the AP sets this field to a second state (e.g., "0").

FIG. 38 illustrates an example embodiment 710 the format of an R-TWT information frame, having the following fields.

A Frame Control field indicates the type of frame. A Duration field contains NAV information used for CSMA/CA channel access. An Address1 field contains the address of the recipient of the frame. An Address2 field contains the address of the STA that transmitted the frame. An Address3 field contains the BSSID of the recipient. A Sequence control field contains the fragment number and the sequence number of the frame.

A R-TWT information field has a format which is shown in FIG. 35. The transmitter sets this field to indicate whether it requests R-TWT related update information from the receiver STA of this frame and the R-TWT related information it wants to update with the receiver STA. If the transmitter requests the R-TWT related update information from the receiver STA, then the receiver STA should respond with R-TWT related information it wants to update with the transmitter STA. For example, the receiver STA can respond with another R-TWT information frame.

FIG. 39 illustrates an example embodiment 730 of an R-TWT update indication frame, having the following fields.

A Frame Control field indicates the type of frame. A Duration field contains NAV information used for CSMA/CA channel access. An Address1 field contains an address for the recipient of the frame. An Address2 field contains the address of the STA that transmitted the frame. An Address3 field contains the BSSID of the recipient. A Sequence control field contains the fragment number and the sequence number of the frame.

A HT control field carries the HE variant field and the A-Control field. The HE variant field is set to indicate it is followed by an A-Control field. The A-Control field has a Control ID field and an R-TWT information update indication field. The control ID field is set to indicate it is followed by the R-TWT Info Update Indication field whose format is shown in FIG. 37. The transmitter sets the R-TWT Info update indication field to which R-TWT related information it has to update with the receiver of this frame.

The format of the A-control field as shown in the figure can be carried by any type of frame which has a HT control field.

4.3.3. Example Operations

This section shows several examples of a quick R-TWT update operation. The network topology in the examples is shown in FIG. 30.

FIG. 40 illustrates an example embodiment 810 of an AP sending an R-TWT trigger frame to request R-TWT related updates from STAs. AP1 812 is the R-TWT scheduling AP of R-TWT1. STA1 814 and STA2 816 are the member STAs of R-TWT1. STA3 818 is a R-TWT scheduled STA, but not a member STA of R-TWT1 before the R-TWT1 SP shown in the figure starts.

When the R-TWT1 SP 820 starts and AP1 contends for the channel with BO 822 and obtains the TXOP, it first sends a R-TWT trigger frame 824 to request R-TWT related updates from the STAs. In order to indicate that the purpose of the R-TWT trigger frame is to request R-TWT related updated, the R-TWT Info Response field in the R-TWT Information field in the R-TWT trigger frame is set to a first state (e.g., "1"). AP1 allocates two RUs, exemplified as RU1 and RU2, in the R-TWT trigger frame for STA1 and STA2 to report whether they have R-TWT related updates to share with AP1, respectively. AP1 also assigns a RA-RU, for example RA-RU3, for an R-TWT scheduled STAs to report their R-TWT related updates. STA3 can access RA-RU3 following the rules defined in IEEE 802.11ax.

After receiving the R-TWT trigger frame, STA1, STA2 and STA3 send R-TWT update indication frames through RUs to report whether they have R-TWT related information to update AP1 with. STA1 responds through RU1 826 to indicate that it has SCS setup (e.g., setting the SCS update field in the R-TWT Info Update Indication field to a first state (e.g., "1") to update with AP1. STA2 responds through RU2 828 that it does not have any R-TWT related information to update AP1 with. STA3 responds through Random Access RU 3 to request membership 830 in R-TWT1 (e.g., setting the membership update field in the R-TWT Info Update Indication field to a first state (e.g., "1").

Then, AP1 can recognize (know) which R-TWT related information the STAs want to update it with and arranges the transmissions for those updates. As shown in the figure, AP1 first sends a basic trigger frame 832 to trigger the SCS setup procedure between STA1 and AP1, as depicted with an SCS Request frame 834 and SCS Response frame 836. Then, another basic trigger frame 838 is sent by AP1 to negotiate the R-TWT1 membership of STA3, with an R-TWT Request frame 840 sent by STA3 to the AP which responds with an R-TWT Response frame 842.

After finishing the R-TWT related information updates between AP1 and STAs, AP1 can adjust and announce the new R-TWT1 SP scheduling. As shown in the figure, AP1 broadcasts a R-TWT Information frame 844 to announce the new R-TWT1 SP scheduling. AP1 decides to extend 846 the R-TWT1 SP duration and the change to the new scheduling takes effect immediately. Then AP1 and the STAs can start data frame exchanges during the R-TWT1 SP.

It should be noted that AP1 can also use R-TWT trigger frame to announce R-TWT scheduling instead of R-TWT Information frame. In at least one embodiment/mode/option the broadcast TWT persistence field in the R-TWT information field should always be set to a second state (e.g., "0").

In at least one embodiment/mode/option when the quick R-TWT update as described in this section is used, the R-TWT member STAs (and/or R-TWT scheduled STAs) have to listen to the beacon (or DTIM beacon) for the update of the R-TWT scheduling. It should be noted that the R-TWT trigger frame does not have to be transmitted at the beginning of the R-TWT SP.

Figure 41:
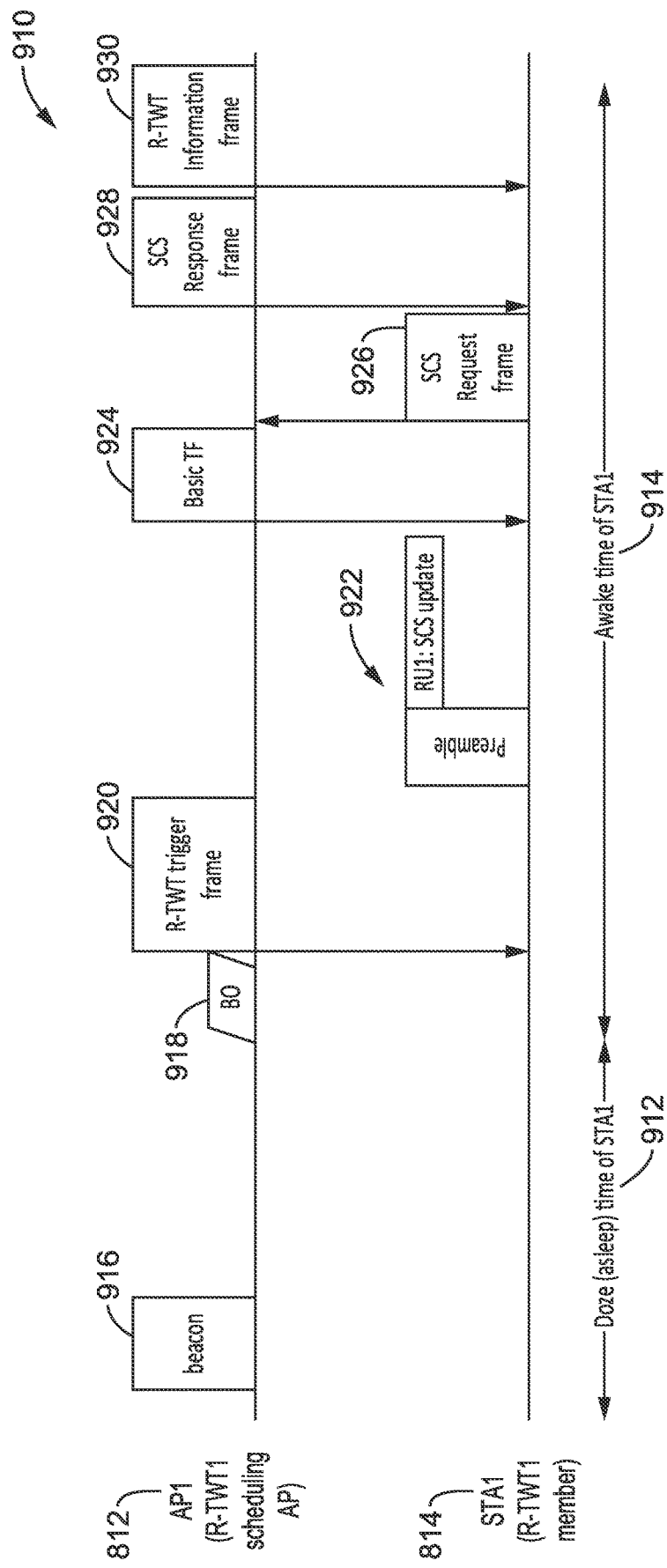
FIG. 41 is a communications diagram of an AP sending an R-TWT trigger frame to request R-TWT related updates from a STA operating in power saving mode, according to at least one embodiment of the present disclosure.

FIG. 41 illustrates an example embodiment 910 of an AP 812 sending an R-TWT trigger frame to request R-TWT related updates from a STA1 814 operating in power save mode. AP1 is the R-TWT scheduling AP of R-TWT1. STA1 is a member STA of R-TWT or R-TWT scheduled STA.

STA1 operates in power save mode. It will enter sleeping mode (i.e., dozing time 912 as shown in the figure) and wake up 914 based on time. As shown in the figure, it is possible that STA1 is in sleeping mode even at Target Beacon Transmission Time (TBTT) and missed the R-TWT scheduling as announced by the beacon.

When STA1 wakes up, AP1 contends for the channel as seen by BO 918 to obtain the TXOP, and sends a R-TWT trigger frame 920 to request R-TWT related updates from the STA1. In order to indicate that the purpose of the R-TWT trigger frame is to request R-TWT related updates, the R-TWT Info Response field in the R-TWT Information field in the R-TWT trigger frame is set to a first state (e.g., "1"). AP1 allocates an RU in the R-TWT trigger frame for STA1 to report whether it has R-TWT related updates to share with AP1.

After receiving the R-TWT trigger frame, STA1 sends R-TWT update indication frames 922 through the RU to report whether it has R-TWT related information to update AP1 with. STA1 responds through the RU to indicate that it has an SCS setup (e.g., setting the SCS update field in the R-TWT Info Update Indication field to a first state "1") to update with AP1.

Upon receiving this update then AP1 recognizes (knows) which R-TWT related information STA1 wants to update it with and arranges the transmissions for those updates. As shown in the figure, AP1 first sends a basic trigger frame 924 to trigger the SCS setup procedure between STA1 and AP1, to which STA1 responds with an SCS request frame 926 to the AP which responds with an SCS Response frame 928. The AP then transmits an R-TWT Information frame 930.

Figure 42:
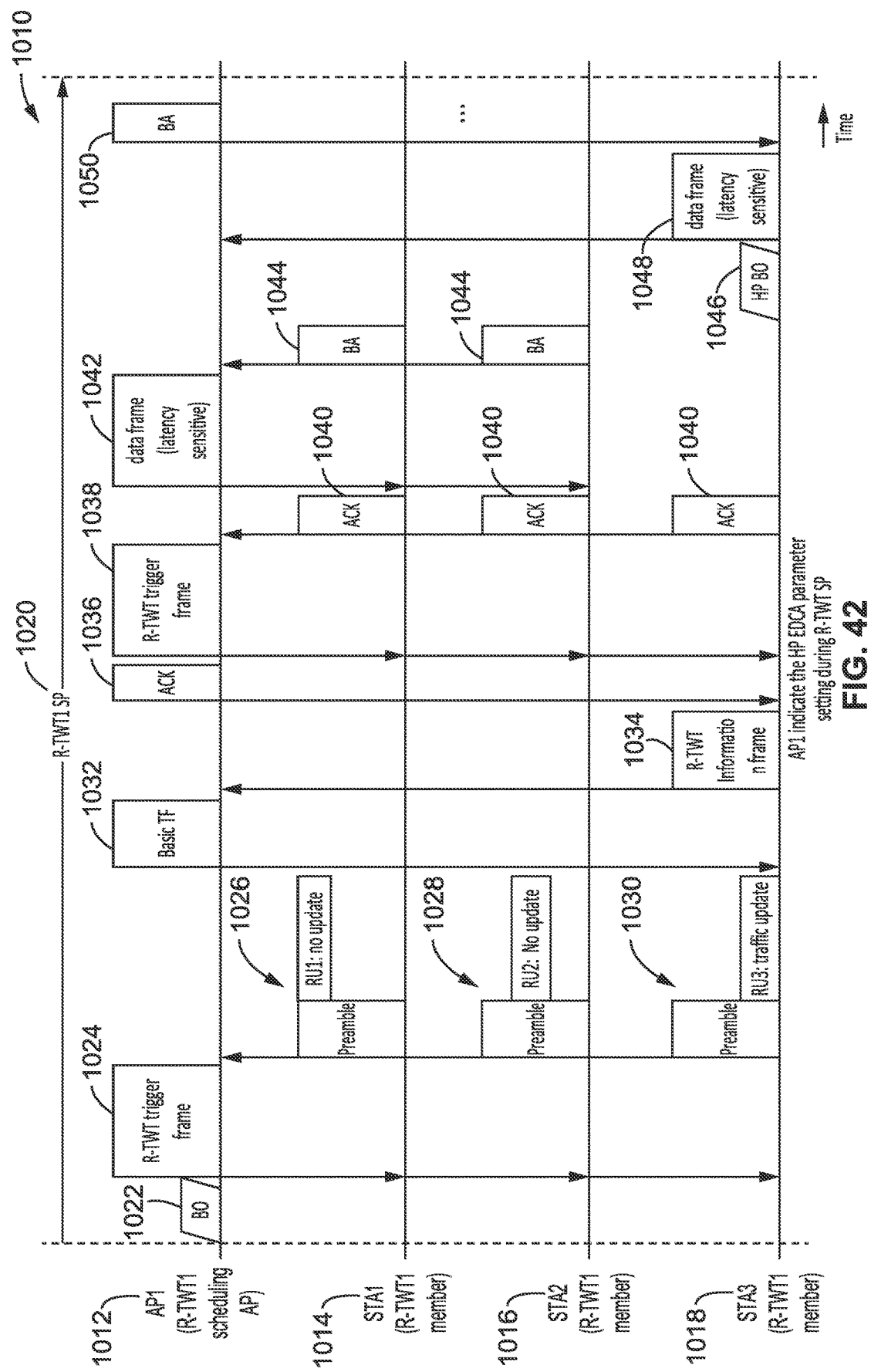
FIG. 42 is a communications diagram of the AP sending a R-TWT trigger frame to announce R-TWT scheduling and requesting feedback, according to at least one embodiment of the present disclosure.

FIG. 42 illustrates an example embodiment 1010 of the AP sending a R-TWT trigger frame to announce R-TWT scheduling and requesting feedback. AP1 1012 is the R-TWT scheduling AP of R-TWT1, while STA1 1014, STA2 1016, and STA3 1018 are member STAs of R-TWT1.

When the R-TWT1 SP starts and AP1 contends for the channel as seen by BO 1022 and obtains TXOP 1020, it first sends a R-TWT trigger frame 1024 to request R-TWT related updates from the STAs. In order to indicate the purpose of the R-TWT trigger frame is to request R-TWT related updates, the R-TWT Info Response field in the R-TWT Information field in the R-TWT trigger frame is set to a first state (e.g., "1"). AP1 allocates three RUs, i.e., RU1, RU2, and RU3, in the R-TWT trigger frame for STA1, STA2, and STA3, respectively, to report whether they have R-TWT related updates to share with AP1.

After receiving the R-TWT trigger frame, STA1, STA2, and STA3 send R-TWT update indication frames through RUs to report whether they have R-TWT related information to update with AP1. STA1 and STA2 respond through RU1 1026 and RU2 1028, respectively, that they do not have any R-TWT related information to update with AP1. STA3 responds through RU3 1030 to indicate that it has an update of TSPEC (e.g., setting the TSPEC update field in the R-TWT Info Update Indication field to a first state (e.g., "1")) to share with AP1.

In response to receiving this information, AP1 recognizes (knows) which R-TWT related information the STAs want to update it with and arranges the transmissions for those updates. As shown in the figure, AP1 sends a basic trigger frame 1032 to trigger the transmission of the update of TSPEC with STA3. Then, STA3 responds with a R-TWT Information frame 1034 with TSPEC element to respond and update TSPEC parameters on its side. It should be noted that in the R-TWT Information frame, the R-TWT Info Response field in the R-TWT Information field is set to a second state (e.g., "0") so that AP1 is not requested to report its R-TWT related updates to STA3 and only sends an Ack frame 1036 to indicate that the update of TSPEC has been received successfully by AP1.

After finishing the R-TWT related information updates between AP1 and STA3, AP1 can adjust and announce a new R-TWT1 SP scheduling. As shown in the figure, AP1 broadcasts a R-TWT trigger frame 1038 to announce the new R-TWT1 SP scheduling. AP1 decides to change the EDCA and MU EDCA parameter settings for the latency sensitive traffic and non-latency sensitive traffic during R-TWT1 SPs. Ack frames are requested by the R-TWT trigger frame and STA1, STA2, and STA3 send Acks 1040 back to indicate the new EDCA and MU EDCA parameter settings have been received successfully. It should be noted that R-TWT trigger frames may only request Ack frames from the active/awake R-TWT1 member STAs.

Then, AP1 continues to transmit its downlink latency sensitive traffic 1042 to STA1 and STA2, which responds back with Acks 1044. STA3 also uses EDCA parameter setting for latency sensitive traffic (EDCA parameter set element for HP traffic in the R-TWT trigger frame to contend 1046 for the channel for its latency sensitive traffic during R-TWT SPs, and is shown sending latency sensitive traffic 1048, and receiving a BA 1050 from AP1.

It should be noted that a STA can use EDCA parameter setting for non-latency sensitive traffic (EDCA parameter set element for LP traffic in the R-TWT trigger frame) to contend for the channel for its non-latency sensitive traffic during R-TWT SPs, although this is not shown in the figure. It should be noted that the R-TWT trigger frame does not have to be transmitted at the beginning of the R-TWT SP.

Figure 43:
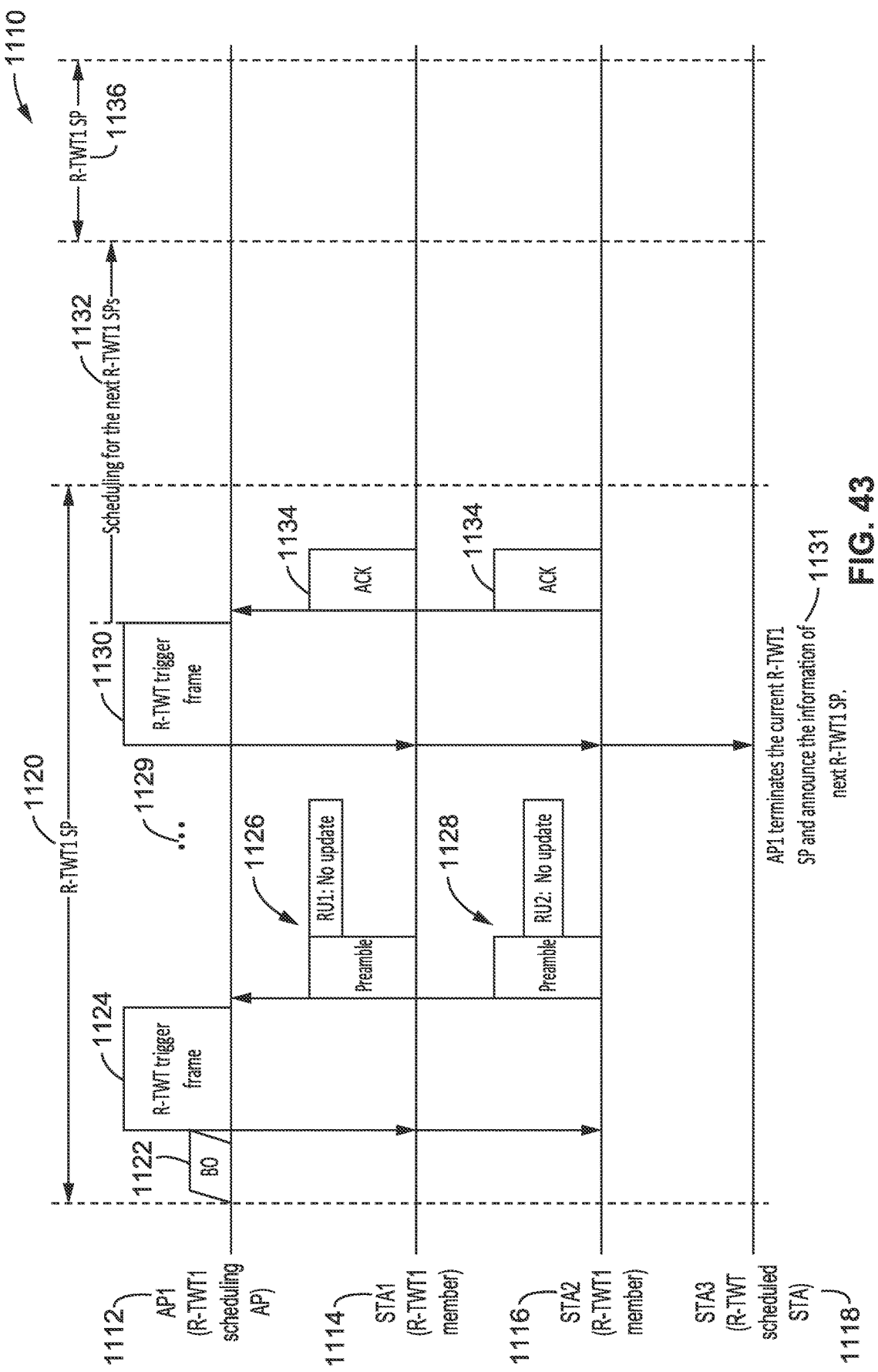
FIG. 43 is a communications diagram of an AP sending a R-TWT trigger frame to announce future R-TWT scheduling and terminate the current R-TWT SP, according to at least one embodiment of the present disclosure.

FIG. 43 illustrates an example embodiment 1110 of an AP sending a R-TWT trigger frame to announce future R-TWT scheduling and terminate the current R-TWT SP 1120. AP1 1112 is the R-TWT scheduling AP of R-TWT1. STA1 1114 and STA2 1116 are member STAs of R-TWT1, while STA3 1118 is a R-TWT scheduled STA, but not a member STA of R-TWT1.

When the R-TWT1 SP starts 1120 and AP1 contends for channel access as seen by BO 1122 and obtains the TXOP, it first sends a R-TWT trigger frame 1124 to request R-TWT related updates from the STAs. In order to indicate that the purpose of the R-TWT trigger frame is to request R-TWT related updates, the R-TWT Info Response field in the R-TWT Information field in the R-TWT trigger frame is set to a first state (e.g., "1"). AP1 allocates two RUs, i.e., RU1 and RU2, in the R-TWT trigger frame for STA1 and STA2 to report whether they have R-TWT related updates to share with AP1, respectively. Also, AP1 sets the EOSP field in the R-TWT information field in the R-TWT trigger frame to a second state (e.g., "0") to indicate that the current R-TWT1 SP has not been terminated.

After receiving the R-TWT trigger frame, STA1 and STA2 send R-TWT update indication frames 1126 and 1128 through RUs to report whether they have R-TWT related information to update AP1 with. In response to receiving these updates, AP1 recognizes (knows) it has nothing to change in the current R-TWT1 SP scheduling and starts a data frame exchange 1129 (the actual exchange is not shown) with STA1 and STA2.

After AP1 finishes the frame exchange with STAs during R-TWT1 SP, AP1 can adjust and announce the new R-TWT1 SP scheduling 1132 according to the transmission status during the R-TWT1 SP. The current R-TWT1 SP is then terminated 1131. As shown in the figure, AP1 then broadcasts a R-TWT trigger frame 1130 (as seen in FIG. 36) to announce scheduling of another R-TWT1 SP 1132. In the R-TWT trigger frame, AP1 sets the EOSP field in in the R-TWT information field in the R-TWT trigger frame to a first state (e.g., "1") to indicate that the current R-TWT1 SP has been terminated. Also, in this trigger frame, AP1 allocates RUs for STA1 and STA2, and indicates that they are to respond with Ack frames 1134 to confirm that they received the new R-TWT1 scheduling successfully. Also, AP1 can allocate an RA-RU to broadcast the R-TWT1 scheduling to all R-TWT scheduled STAs, such as non-member STA3. It should be noted that the R-TWT trigger frame does not have to be transmitted at the beginning of the R-TWT SP. Then the next R-TWT SP TXOP commences 1136.

Figure 44:
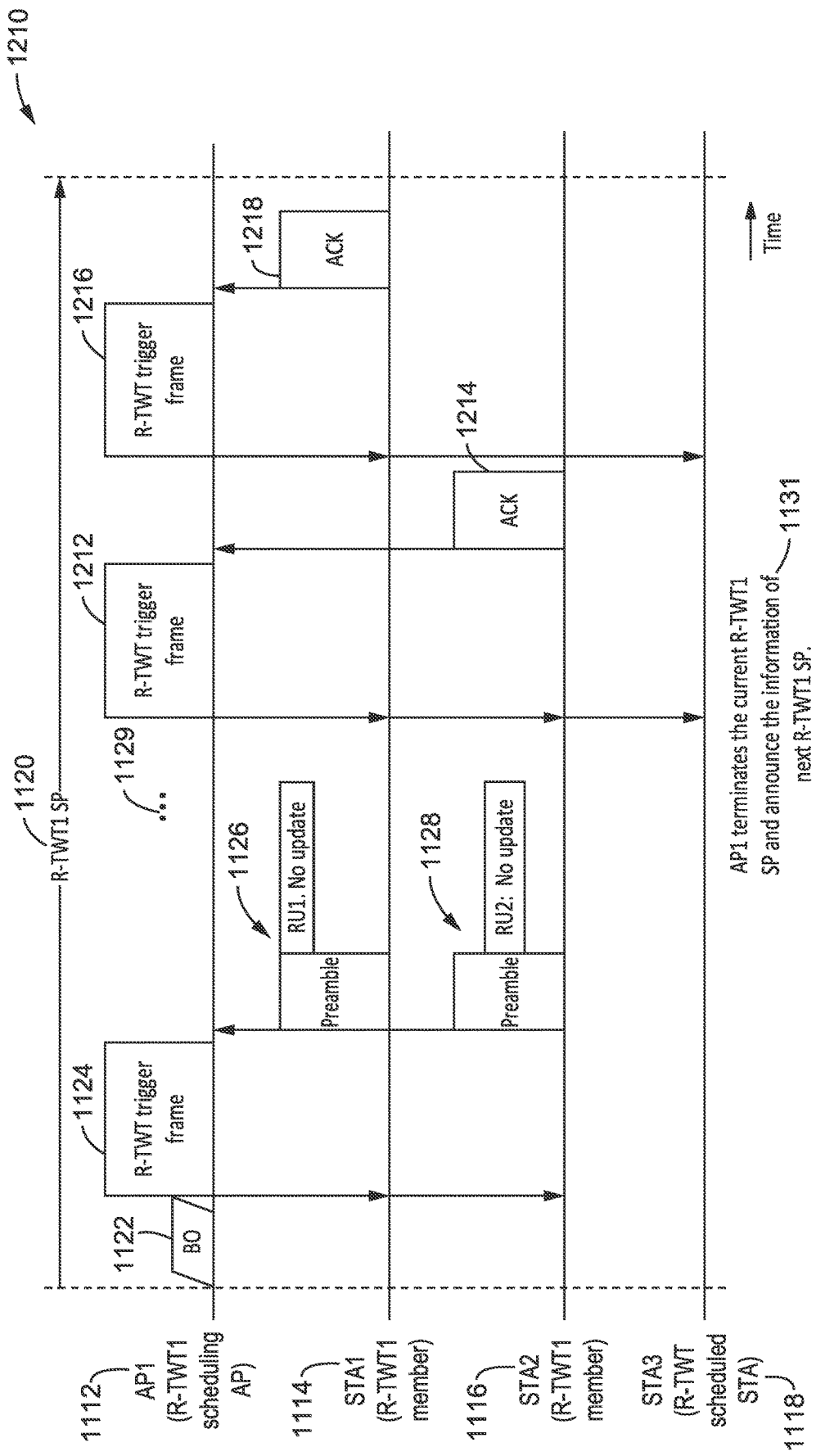
FIG. 44 is a communications diagram of an AP retransmitting an R-TWT trigger frame to ensure that all the R-TWT member STAs receive the latest R-TWT scheduling successfully, according to at least one embodiment of the present disclosure.

FIG. 44 illustrates an example embodiment 1210 of an AP retransmitting an R-TWT trigger frame to ensure that all the R-TWT member STAs receive the latest R-TWT scheduling successfully. AP1 1112 is the R-TWT scheduling AP of R-TWT1. STA1 1114 and STA2 1116 are the member STAs of R-TWT1; while STA3 1118 is a R-TWT scheduled STA, but not a member STA of R-TWT1.

The beginning of this sequence is the same as was shown in FIG. 43. When the R-TWT1 SP starts and AP1 contends for 1122 and obtains the TXOP 1120, it first sends a R-TWT trigger frame 1124 to request R-TWT related updates from the STAs. In order to indicate the purpose of the R-TWT trigger frame is to request R-TWT related updated, the R-TWT Info Response field in the R-TWT Information field in the R-TWT trigger frame is set to a first state (e.g., "1"). AP1 allocates RUs, shown as RU1 and RU2, in the R-TWT trigger frame for STA1 and STA2 to report whether they have R-TWT related updates to share with AP1, respectively. Also, AP1 sets the EOSP field in the R-TWT information field in the R-TWT trigger frame to a second state (e.g., "0") to indicate that the current R-TWT1 SP has not been terminated.

After receiving the R-TWT trigger frame, STA1 and STA2 send R-TWT update indication frames 1126 and 1128 through RUs to report whether they have R-TWT related information to update AP1 with.

In response to receiving these updates, AP1 recognizes (knows) it has nothing to change in the current R-TWT1 SP scheduling, and starts a data frame exchange 1129 (the actual exchange is not shown) with STA1 and STA2, after which the current R-TWT1 SP is terminated 1131.

The following portions of this figure now depart from that of the previous figure. After AP1 finishes its frame exchange with STAs during R-TWT1 SP, AP1 can adjust and announce the new R-TWT1 SP scheduling according to the transmission status during R-TWT1 SP. As shown in the figure, AP1 sends a R-TWT trigger frame 1212 to announce the next (a future) R-TWT1 SP scheduling. In the R-TWT trigger frame, AP1 sets the EOSP field in in the R-TWT information field in the R-TWT trigger frame to a first state (e.g., "1") to indicate that the current R-TWT1 SP is terminated. Also, in the trigger frame, AP1 can allocate RUs for STA1 and STA2, and can indicate if they are to respond with Ack frames to confirm that they have received the new R-TWT1 scheduling successfully. Also, STA3 can allocate an RA-RU to broadcast the R-TWT1 scheduling to all R-TWT scheduled STAs, such as non-member STA3.

However, although AP1 receives an Ack 1214 from STA2, it does not receive an Ack from STA1 or STA3. So AP1 retransmits the R-TWT trigger frame 1216 to STA2 and STA3. Since STA2 has responded with the Ack to the R-TWT trigger frame for the first time, AP1 only requests the Ack response from the other STAs, but not from STA2 for the retransmission of the R-TWT trigger frame. This time, STA1 responds with Ack 1218, which when received by AP1 allows it to recognize (know) that all the R-TWT1 member STAs have received the latest R-TWT1 scheduling successfully, and the current R-TWT1 SP is terminated. It should be noted that STA3 is not a member STA in the above example. It should be noted that the R-TWT trigger frame does not have to be transmitted at the beginning of the R-TWT SP.

Figure 45:
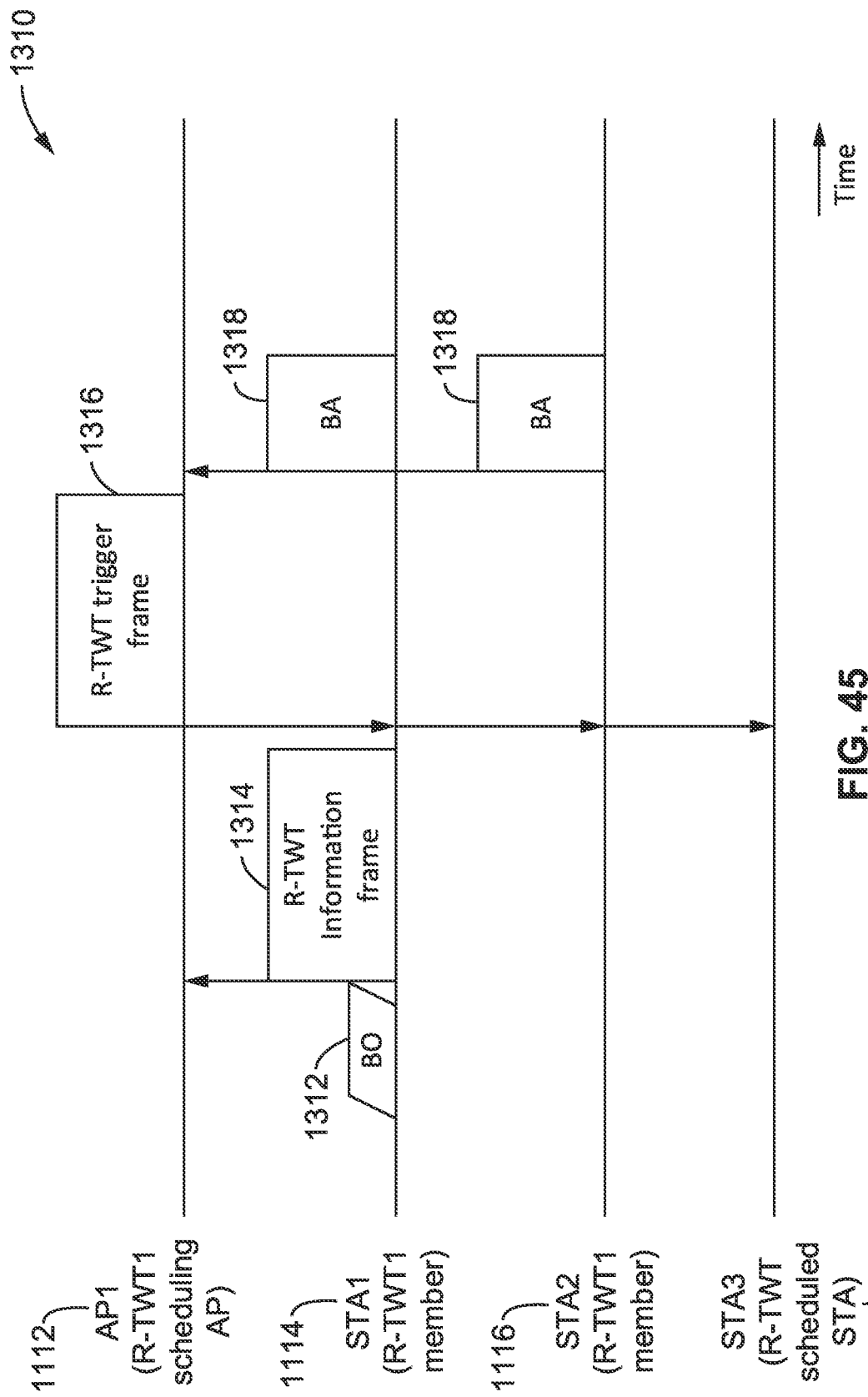
FIG. 45 is a communications diagram of a non-AP STA actively updating the AP with its R-TWT related information, according to at least one embodiment of the present disclosure.

FIG. 45 illustrates an example embodiment 1310 of a non-AP STA actively updating the AP 1112 (AP1) with its R-TWT related information. The figures depict interaction between AP1 1112, STA1 1114, STA2 1116 and STA3 1118. Again, STA1 and STA2 are scheduled member STAs, while STA3 is scheduled, but not a member STA of the R-TWT.

After the non-AP STA contends 1312 for and obtains the TXOP, it sends a R-TWT Information frame 1314 to report its R-TWT related information to the AP. Then, the AP can send a R-TWT trigger frame 1316 to announce the new R-TWT scheduling and request Ack responses 1318 from the R-TWT member STAs.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA); (b) a processor of said STA; (c) a non-transitory memory storing instructions executable by the processor for communicating with other STAs and fulfilling different roles of a communications protocol; and (d) wherein said instructions, when executed by the processor, perform one or more steps of a protocol for scheduling restricted target wait time (R-TWT) comprising: (d)(i) wherein an AP performing as an R-TWT scheduling AP announces R-TWT scheduling to exchange frames with member STAs of an R-TWT during the R-TWT service periods (SPs); (d)(ii) sending a frame, from the R-TWT scheduling AP, to ask whether its R-TWT scheduled STAs have R-TWT information to update the R-TWT scheduling AP on; (d)(iii) receiving a response from an R-TWT scheduled STA on whether it has information related to the R-TWT to update; (d)(iv) triggering the transmissions for those R-TWT scheduled STAs, by the R-TWT scheduling AP; (d)(v) receiving update information from or more R-TWT scheduled STAs with update information related to the R-TWT; and (d)(vi) adjusting scheduling and announcing new R-TWT SP scheduling, by the R-TWT scheduling AP, according to the updates reported by the non-AP STAs.

An apparatus for wireless communication in a network, the apparatus comprising: (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA); (b) a processor of said STA; (c) a non-transitory memory storing instructions executable by the processor for communicating with other STAs and fulfilling different roles of a communications protocol; and (d) wherein said instructions, when executed by the processor, perform one or more steps of a protocol for scheduling restricted target wait time (R-TWT) comprising: (d)(i) wherein an AP performing as an R-TWT scheduling AP announces R-TWT scheduling to exchange frames with member STAs of an R-TWT during the R-TWT service periods (SPs); (d)(ii) sending a frame, from the R-TWT scheduling AP, to ask whether its R-TWT scheduled STAs have R-TWT information to update the R-TWT scheduling AP on; (d)(iii) receiving a response from an R-TWT scheduled STA on whether it has information related to the R-TWT to update; (d)(iv) triggering the transmissions for those R-TWT scheduled STAs, by the R-TWT scheduling AP by using a R-TWT trigger frame for triggering the transmissions for those R-TWT scheduled STAs to report update information; (d)(v) wherein said R-TWT trigger frame includes resource unit (RU) allocation information directed to each R-TWT member STA of the R-TWT, directing each R-TWT member STA to use the allocated RU to report whether it has information to update; (d)(vi) receiving update information from or more R-TWT scheduled STAs with update information related to the R-TWT; and (d)(vii) adjusting scheduling and announcing new R-TWT SP scheduling, by the R-TWT scheduling AP, according to the updates reported by the non-AP STAs.

A method of performing wireless communication in a network, comprising: (a) communicating between stations (STA), operating as either an access point (AP) or a non-AP STA, wirelessly communicating with other STAs on a wireless local area network (WLAN) in an IEEE 802.11 protocol configured for supporting carrier sense multiple access/ collision avoidance (CSMA/CA) and scheduling restricted target wait time (R-TWT); (b) wherein an AP performing as an R-TWT scheduling AP performs announcing R-TWT scheduling to exchange frames with member STAs of an R-TWT during the R-TWT service periods (SPs); (c) sending a frame, from the R-TWT scheduling AP, to ask whether its R-TWT scheduled STAs have R-TWT information to update the R-TWT scheduling AP on; (d) receiving a response from an R-TWT scheduled STA on whether it has information related to the R-TWT to update; (e) triggering the transmissions for those R-TWT scheduled STAs, by the R-TWT scheduling AP; (f) receiving update information from or more R-TWT scheduled STAs with update information related to the R-TWT; and (g) adjusting scheduling and announcing new R-TWT SP scheduling, by the R-TWT scheduling AP, according to the updates reported by the non-AP STAs.

A wireless communication system/apparatus performing transmission of packets, where the R-TWT scheduling AP announces R-TWT scheduling to exchange frames with the member STAs of the R-TWT during the R-TWT SPs, comprising: (a) the R-TWT scheduling AP sends a frame to ask whether its R-TWT scheduled STAs have information related to a R-TWT to update; (b) the R-TWT scheduled STA responds whether it has information related to the R-TWT to update; (c) the R-TWT scheduling AP triggers the transmissions for those R-TWT scheduled STAs to update the information related to the R-TWT; and (d) the R-TWT scheduling AP adjusts and announces the R-TWT SP scheduling according to the updates reported by the non-AP STAs.

The apparatus or method or system of any preceding implementation, wherein the R-TWT scheduling AP transmits a R-TWT trigger frame for triggering the transmissions for those R-TWT scheduled STAs to report update information.

The apparatus or method or system of any preceding implementation, wherein in the R-TWT trigger frame the R-TWT scheduling AP transmits a resource unit (RU) allocation in the R-TWT trigger frame to each R-TWT member STA of the R-TWT, whereby each R-TWT member STA uses an allocated RU to report whether it has information to update.

The apparatus or method or system of any preceding implementation, further comprising transmitting an R-TWT trigger frame by the R-TWT scheduling AP for allocating random access resource units (RA-RUs) in the R-TWT trigger frame for STAs which are not members of the R-TWT SP so that these STAs can utilize the allocated RA-RUs to report if there is any update information.

The apparatus or method or system of any preceding implementation, further comprising receiving information about what is to be updated with the R-TWT scheduling AP, when an R-TWT scheduled STA responds as to whether it has information related to the R-TWT to update the AP on.

The apparatus or method or system of any preceding implementation, wherein the information about what is to be updated with the R-TWT scheduling AP is indicated by the R-TWT scheduled STA in an A-control subfield.

The apparatus or method or system of any preceding implementation, further comprising the R-TWT scheduling AP receiving updates on TSPEC parameters of the traffic streams that is transmitted during the R-TWT SPs from an R-TWT scheduled STA.

The apparatus or method or system of any preceding implementation, further comprising the R-TWT scheduling AP receiving updates from a R-TWT scheduled STA on traffic identification (TID) information whose traffic is prioritized to transmit during the R-TWT SPs.

The apparatus or method or system of any preceding implementation, further comprising the R-TWT scheduling AP receiving updates from a R-TWT scheduled STA on its membership status in the R-TWT.

The apparatus or method or system of any preceding implementation, further comprising announcing R-TWT SP adjustments by the R-TWT scheduling AP operating during a R-TWT SP, and in which the adjustments take immediate effect.

The apparatus or method or system of any preceding implementation, further comprising announcing R-TWT SP adjustments by the R-TWT scheduling AP operating during a R-TWT SP, and in which the adjustments take effect at a later time.

The apparatus or method or system of any preceding implementation, further comprising the R-TWT scheduling AP announcing adjustment of R-TWT SPs which extend or shrink R-TWT SP duration.

The apparatus or method or system of any preceding implementation, further comprising the R-TWT scheduling AP transmitting a R-TWT trigger frame to announce R-TWT SP scheduling and allocating a resource unit (RU) in the R-TWT trigger frame to each R-TWT member STA of the R-TWT, which each R-TWT member STA uses to report whether it received the announcement successfully.

The apparatus or method or system of any preceding implementation, further comprising the R-TWT scheduling AP transmitting a R-TWT trigger frame to announce R-TWT SP scheduling and allocate a recipient address (RA) resource unit (RU) in the R-TWT trigger frame for broadcasting the R-TWT SP scheduling.

The apparatus or method or system of any preceding implementation, further comprising the R-TWT scheduling AP during a R-TWT SP transmitting a R-TWT trigger frame to announce R-TWT SP scheduling for a future time, and terminating a current R-TWT SP.

The apparatus or method or system of any preceding implementation, further comprising the R-TWT scheduling AP indicating enhanced distributed channel access (EDCA) parameter settings for latency sensitive traffic during R-TWT SPs in the R-TWT scheduling announcement frame.

The apparatus or method or system of any preceding implementation, further comprising the R-TWT scheduling AP indicating enhanced distributed channel access (EDCA) parameter settings for non-latency sensitive traffic, during R-TWT SPs in the R-TWT scheduling announcement frame.

The apparatus or method or system of any preceding implementation, wherein the R-TWT scheduling AP sends a R-TWT trigger frame and allocates an RU in the R-TWT trigger frame to each R-TWT member STA of the R-TWT so that the R-TWT member STA uses the RU to report whether it has information to update.

The apparatus or method or system of any preceding implementation, wherein the R-TWT scheduling AP sends a R-TWT trigger frame and allocates RA-RUs in the R-TWT trigger frame for STAs which are not the members of the R-TWT so that the STAs use the RA-RUs to report whether it has information to update.

The apparatus or method or system of any preceding implementation, wherein the R-TWT scheduled STA responding whether it has information related to the R-TWT to update indicates which information it needs to update with the R-TWT scheduling AP The apparatus or method or system of any preceding implementation, wherein the R-TWT scheduled STA responds as to whether it has information related to the R-TWT to update and indicates which information it needs to update with the R-TWT scheduling AP in an A-control subfield.

The apparatus or method or system of any preceding implementation, wherein the R-TWT scheduled STA can update the TSPEC parameters of the traffic streams that are transmitted during the R-TWT SPs.

The apparatus or method or system of any preceding implementation, wherein the R-TWT scheduled STA updates the TID information whose traffic is prioritized to transmit during the R-TWT SPs.

The apparatus or method or system of any preceding implementation, wherein the R-TWT scheduled STA update its membership status of the R-TWT.

The apparatus or method or system of any preceding implementation, wherein the R-TWT scheduling AP operating during a R-TWT SP announce the adjustment of that R-TWT SP which takes effect immediately.

The apparatus or method or system of any preceding implementation, wherein the R-TWT scheduling AP announces the adjustment of R-TWT SPs which takes effect immediately in the future.

The apparatus or method or system of any preceding implementation, wherein the R-TWT scheduling AP announcing the adjustment of R-TWT SPs changes R-TWT SP duration.

The apparatus or method or system of any preceding implementation, wherein the R-TWT scheduling AP sends a R-TWT trigger frame to announce the R-TWT SP scheduling and allocates an RU in the R-TWT trigger frame to each R-TWT member STA of the R-TWT so that the R-TWT member STA use the RU to report whether they have received the announcement successfully.

The apparatus or method or system of any preceding implementation, wherein the R-TWT scheduling AP sends a R-TWT trigger frame to announce the R-TWT SP scheduling and allocates an RA-RU in the R-TWT trigger frame for broadcasting the R-TWT SP scheduling.

The apparatus or method or system of any preceding implementation, wherein the R-TWT scheduling AP operating during a R-TWT SP send a R-TWT trigger frame to announce R-TWT SP scheduling in the future and terminate the current R-TWT SP.

The apparatus or method or system of any preceding implementation, wherein the R-TWT scheduling AP indicates EDCA parameter setting for latency sensitive traffic and the EDCA parameter setting for non-latency sensitive traffic during the R-TWT SPs in the R-TWT scheduling announcement frame.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to 5°, less than or equal to 4°, less than or equal to 3°, less than or equal to 2°, less than or equal to 1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA);
   (b) a processor of said STA;
   (c) a non-transitory memory storing instructions executable by the processor for communicating with other STAs and fulfilling different roles of a communications protocol; and (d) wherein said instructions, when executed by the processor, perform one or more steps of a protocol for scheduling restricted target wait time (R-TWT) comprising:
  (i) wherein an AP performing as an R-TWT scheduling AP announces R-TWT scheduling to exchange frames with member STAs of an R-TWT during the R-TWT service periods (SPs);
  (ii) sending a frame, from the R-TWT scheduling AP, to ask whether its R-TWT scheduled STAs have R-TWT information to update the R-TWT scheduling AP on;
  (iii) receiving a response from an R-TWT scheduled STA on whether it has information related to the R-TWT to update;
  (iv) triggering the transmissions for those R-TWT scheduled STAs, by the R-TWT scheduling AP;
  (v) receiving update information from or more R-TWT scheduled STAs with update information related to the R-TWT;
  (vi) adjusting scheduling and announcing new R-TWT SP scheduling, by the R-TWT scheduling AP, according to the updates reported by the non-AP STAs; and
  (v) transmitting an R-TWT trigger frame by the R-TWT scheduling AP for allocating random access resource units (RA-RUs) in the R-TWT trigger frame for STAs which are not members of the R-TWT SP so that these STAs can utilize the allocated RA-RUs to report if there is any update information.

2. The apparatus of claim 1, wherein the R-TWT scheduling AP transmits a R-TWT trigger frame for triggering the transmissions for those R-TWT scheduled STAs to report update information.

3. The apparatus of claim 2, wherein in the R-TWT trigger frame the R-TWT scheduling AP transmits a resource unit (RU) allocation in the R-TWT trigger frame to each R-TWT member STA of the R-TWT, whereby each R-TWT member STA uses an allocated RU to report whether it has information to update.

4. The apparatus of claim 1, further comprising receiving information about what is to be updated with the R-TWT scheduling AP, when an R-TWT scheduled STA responds as to whether it has information related to the R-TWT to update the AP on.

5. The apparatus of claim 4, wherein the information about what is to be updated with the R-TWT scheduling AP is indicated by the R-TWT scheduled STA in an A-control subfield.

6. The apparatus of claim 1, further comprising the R-TWT scheduling AP receiving updates on TSPEC parameters of the traffic streams that is transmitted during the R-TWT SPs from an R-TWT scheduled STA.

7. The apparatus of claim 1, further comprising the R-TWT scheduling AP receiving updates from a R-TWT scheduled STA on traffic identification (TID) information whose traffic is prioritized to transmit during the R-TWT SPs.

8. The apparatus of claim 1, further comprising the R-TWT scheduling AP receiving updates from a R-TWT scheduled STA on its membership status in the R-TWT.

9. The apparatus of claim 1, further comprising the R-TWT scheduling AP announcing adjustment of R-TWT SPs which extend or shrink R-TWT SP duration.

10. The apparatus of claim 1, further comprising the R-TWT scheduling AP indicating enhanced distributed channel access (EDCA) parameter settings for latency sensitive traffic during R-TWT SPs in the R-TWT scheduling announcement frame.

11. The apparatus of claim 1, further comprising the R-TWT scheduling AP indicating enhanced distributed channel access (EDCA) parameter settings for non-latency sensitive traffic, during R-TWT SPs in the R-TWT scheduling announcement frame.

12. An apparatus for wireless communication in a network, the apparatus comprising:
  (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA);
  (b) a processor of said STA;
  (c) a non-transitory memory storing instructions executable by the processor for communicating with other STAs and fulfilling different roles of a communications protocol; and
  (d) wherein said instructions, when executed by the processor, perform one or more steps of a protocol for scheduling restricted target wait time (R-TWT) comprising:
    (i) wherein an AP performing as an R-TWT scheduling AP announces R-TWT scheduling to exchange frames with member STAs of an R-TWT during the R-TWT service periods (SPs);
    (ii) sending a frame, from the R-TWT scheduling AP, to ask whether its R-TWT scheduled STAs have R-TWT information to update the R-TWT scheduling AP on;
    (iii) receiving a response from an R-TWT scheduled STA on whether it has information related to the R-TWT to update;
    (iv) triggering the transmissions for those R-TWT scheduled STAs, by the R-TWT scheduling AP by using a R-TWT trigger frame for triggering the transmissions for those R-TWT scheduled STAs to report update information;
    (v) wherein said R-TWT trigger frame includes resource unit (RU) allocation information directed to each R-TWT member STA of the R-TWT, directing each R-TWT member STA to use the allocated RU to report whether it has information to update;
    (vi) receiving update information from or more R-TWT scheduled STAs with update information related to the R-TWT;
    (vii) adjusting scheduling and announcing new R-TWT SP scheduling, by the R-TWT scheduling AP, according to the updates reported by the non-AP STAs; and
    transmitting an R-TWT trigger frame by the R-TWT scheduling AP for allocating random access resource units (RA-RUs) in the R-TWT trigger frame for STAs which are not members of the R-TWT SP so that these STAs can utilize the allocated RA-RUs to report if there is any update information.

13. An apparatus for wireless communication in a network, the apparatus comprising:
  (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA);

(b) a processor of said STA;
(c) a non-transitory memory storing instructions executable by the processor for communicating with other STAs and fulfilling different roles of a communications protocol; and
(d) wherein said instructions, when executed by the processor, perform one or more steps of a protocol for scheduling restricted target wait time (R-TWT) comprising:
  (i) wherein an AP performing as an R-TWT scheduling AP announces R-TWT scheduling to exchange frames with member STAs of an R-TWT during the R-TWT service periods (SPs);
  (ii) sending a frame, from the R-TWT scheduling AP, to ask whether its R-TWT scheduled STAs have R-TWT information to update the R-TWT scheduling AP on;
  (iii) receiving a response from an R-TWT scheduled STA on whether it has information related to the R-TWT to update;
  (iv) triggering the transmissions for those R-TWT scheduled STAs, by the R-TWT scheduling AP;
  (v) receiving update information from or more R-TWT scheduled STAs with update information related to the R-TWT;
  (vi) adjusting scheduling and announcing new R-TWT SP scheduling, by the R-TWT scheduling AP, according to the updates reported by the non-AP STAs; and
  (vii) wherein the R-TWT scheduling AP operating during a R-TWT SP performs announcing R-TWT SP adjustments which take immediate effect.

14. An apparatus for wireless communication in a network, the apparatus comprising:
  (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA);
  (b) a processor of said STA;
  (c) a non-transitory memory storing instructions executable by the processor for communicating with other STAs and fulfilling different roles of a communications protocol; and
  (d) wherein said instructions, when executed by the processor, perform one or more steps of a protocol for scheduling restricted target wait time (R-TWT) comprising:
    (i) wherein an AP performing as an R-TWT scheduling AP announces R-TWT scheduling to exchange frames with member STAs of an R-TWT during the R-TWT service periods (SPs);
    (ii) sending a frame, from the R-TWT scheduling AP, to ask whether its R-TWT scheduled STAs have R-TWT information to update the R-TWT scheduling AP on;
    (iii) receiving a response from an R-TWT scheduled STA on whether it has information related to the R-TWT to update;
    (iv) triggering the transmissions for those R-TWT scheduled STAs, by the R-TWT scheduling AP;
    (v) receiving update information from or more R-TWT scheduled STAs with update information related to the R-TWT; and
    (vi) adjusting scheduling and announcing new R-TWT SP scheduling, by the R-TWT scheduling AP, according to the updates reported by the non-AP STAs, and;
    (vii) wherein during a R-TWT SP the R-TWT scheduling AP performs announcing R-TWT SP adjustments which are to take effect at a later time.

15. An apparatus for wireless communication in a network, the apparatus comprising:
  (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA);
  (b) a processor of said STA;
  (c) a non-transitory memory storing instructions executable by the processor for communicating with other STAs and fulfilling different roles of a communications protocol; and
  (d) wherein said instructions, when executed by the processor, perform one or more steps of a protocol for scheduling restricted target wait time (R-TWT) comprising:
    (i) wherein an AP performing as an R-TWT scheduling AP announces R-TWT scheduling to exchange frames with member STAs of an R-TWT during the R-TWT service periods (SPs);
    (ii) sending a frame, from the R-TWT scheduling AP, to ask whether its R-TWT scheduled STAs have R-TWT information to update the R-TWT scheduling AP on;
    (iii) receiving a response from an R-TWT scheduled STA on whether it has information related to the R-TWT to update;
    (iv) triggering the transmissions for those R-TWT scheduled STAs, by the R-TWT scheduling AP;
    (v) receiving update information from or more R-TWT scheduled STAs with update information related to the R-TWT;
    (vi) adjusting scheduling and announcing new R-TWT SP scheduling, by the R-TWT scheduling AP, according to the updates reported by the non-AP STAs; and
    (vii) wherein the R-TWT scheduling AP performs transmitting a R-TWT trigger frame to announce R-TWT SP scheduling and allocating a resource unit (RU) in the R-TWT trigger frame to each R-TWT member STA of the R-TWT, which each R-TWT member STA uses to report whether it received the announcement successfully.

16. An apparatus for wireless communication in a network, the apparatus comprising:
  (a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA);
  (b) a processor of said STA;
  (c) a non-transitory memory storing instructions executable by the processor for communicating with other STAs and fulfilling different roles of a communications protocol; and (d) wherein said instructions, when executed by the processor, perform one or more steps of a protocol for scheduling restricted target wait time (R-TWT) comprising:
- (i) wherein an AP performing as an R-TWT scheduling AP announces R-TWT scheduling to exchange frames with member STAs of an R-TWT during the R-TWT service periods (SPs);
- (ii) sending a frame, from the R-TWT scheduling AP, to ask whether its R-TWT scheduled STAs have R-TWT information to update the R-TWT scheduling AP on;
- (iii) receiving a response from an R-TWT scheduled STA on whether it has information related to the R-TWT to update;
- (iv) triggering the transmissions for those R-TWT scheduled STAs, by the R-TWT scheduling AP;
- (v) receiving update information from or more R-TWT scheduled STAs with update information related to the R-TWT;
- (vi) adjusting scheduling and announcing new R-TWT SP scheduling, by the R-TWT scheduling AP, according to the updates reported by the non-AP STAs; and
- (vii) wherein the R-TWT scheduling AP performs transmitting a R-TWT trigger frame to announce R-TWT SP scheduling and allocate a recipient address (RA) resource unit (RU) in the R-TWT trigger frame for broadcasting the R-TWT SP scheduling.

17. An apparatus for wireless communication in a network, the apparatus comprising:
(a) a wireless communication circuit, as a station (STA), operating as an access point (AP) or non-AP STA, wirelessly communicating with other STAs on a wireless local area network (WLAN) in an IEEE 802.11 protocol configured for supporting carrier sense multiple access/collision avoidance (CSMA/CA);
(b) a processor of said STA;
(c) a non-transitory memory storing instructions executable by the processor for communicating with other STAs and fulfilling different roles of a communications protocol; and
(d) wherein said instructions, when executed by the processor, perform one or more steps of a protocol for scheduling restricted target wait time (R-TWT) comprising:
- (i) wherein an AP performing as an R-TWT scheduling AP announces R-TWT scheduling to exchange frames with member STAs of an R-TWT during the R-TWT service periods (SPs);
- (ii) sending a frame, from the R-TWT scheduling AP, to ask whether its R-TWT scheduled STAs have R-TWT information to update the R-TWT scheduling AP on;
- (iii) receiving a response from an R-TWT scheduled STA on whether it has information related to the R-TWT to update;
- (iv) triggering the transmissions for those R-TWT scheduled STAs, by the R-TWT scheduling AP;
- (v) receiving update information from or more R-TWT scheduled STAs with update information related to the R-TWT;
- (vi) adjusting scheduling and announcing new R-TWT SP scheduling, by the R-TWT scheduling AP, according to the updates reported by the non-AP STAs; and
- (vii) wherein the R-TWT scheduling AP during a R-TWT SP, transmits a R-TWT trigger frame to announce R-TWT SP scheduling for a future time, and terminating a current R-TWT SP.

* * * * *